United States Patent
Frenken

(10) Patent No.: US 10,439,351 B2
(45) Date of Patent: Oct. 8, 2019

(54) CRIMPING PLIERS, AND TOOTHED WHEEL HAVING TEETH

(71) Applicant: GUSTAV KLAUKE GMBH, Remscheid (DE)

(72) Inventor: Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 133 days.

(21) Appl. No.: 15/536,243

(22) PCT Filed: Dec. 14, 2015

(86) PCT No.: PCT/EP2015/079599
§ 371 (c)(1),
(2) Date: Jun. 15, 2017

(87) PCT Pub. No.: WO2016/096732
PCT Pub. Date: Jun. 23, 2016

(65) Prior Publication Data
US 2018/0040998 A1    Feb. 8, 2018

(30) Foreign Application Priority Data

Dec. 17, 2014  (DE) .......................... 10 2014 118 858
Apr. 28, 2015  (DE) .......................... 10 2015 106 562

(51) Int. Cl.
*B21D 7/06*        (2006.01)
*H01R 43/042*    (2006.01)
(Continued)

(52) U.S. Cl.
CPC ............. *H01R 43/042* (2013.01); *B25B 7/04* (2013.01); *B25B 7/12* (2013.01); *B25B 7/16* (2013.01);
(Continued)

(58) Field of Classification Search
CPC .... B25B 7/04; B25B 7/12; B25B 7/16; B25B 7/22; B25B 27/146; F16H 1/22; F16H 55/14; H01R 43/042
(Continued)

(56) References Cited

U.S. PATENT DOCUMENTS 2,838,970 A    6/1958    Motches et al.
3,085,313 A    4/1963    Macy
(Continued)

FOREIGN PATENT DOCUMENTS

DE    1465239 A1    1/1969
DE    2841588 A1    3/1980
(Continued)

OTHER PUBLICATIONS

International Search Report for corresponding International Patent Application No. PCT/EP2015/079599 dated Jun. 27, 2016, 7 pages.
(Continued)

*Primary Examiner* — David B Jones
(74) *Attorney, Agent, or Firm* — Klintworth & Rozenblat IP LLP

(57) ABSTRACT

The disclosure relates to crimping pliers configured to crimp cable lugs onto electrical conductors. The crimping pliers includes two crimping jaws which can be swiveled towards one another. In each crimping jaw, a crimping matrix configured with a plurality of different crimping dies over a circumference is rotatably mounted with respect to an axis of rotation. The crimping matrices are permanently coupled to each other via the gearing independently of a swivel position of the crimping jaws.

40 Claims, 24 Drawing Sheets

Figure 1:
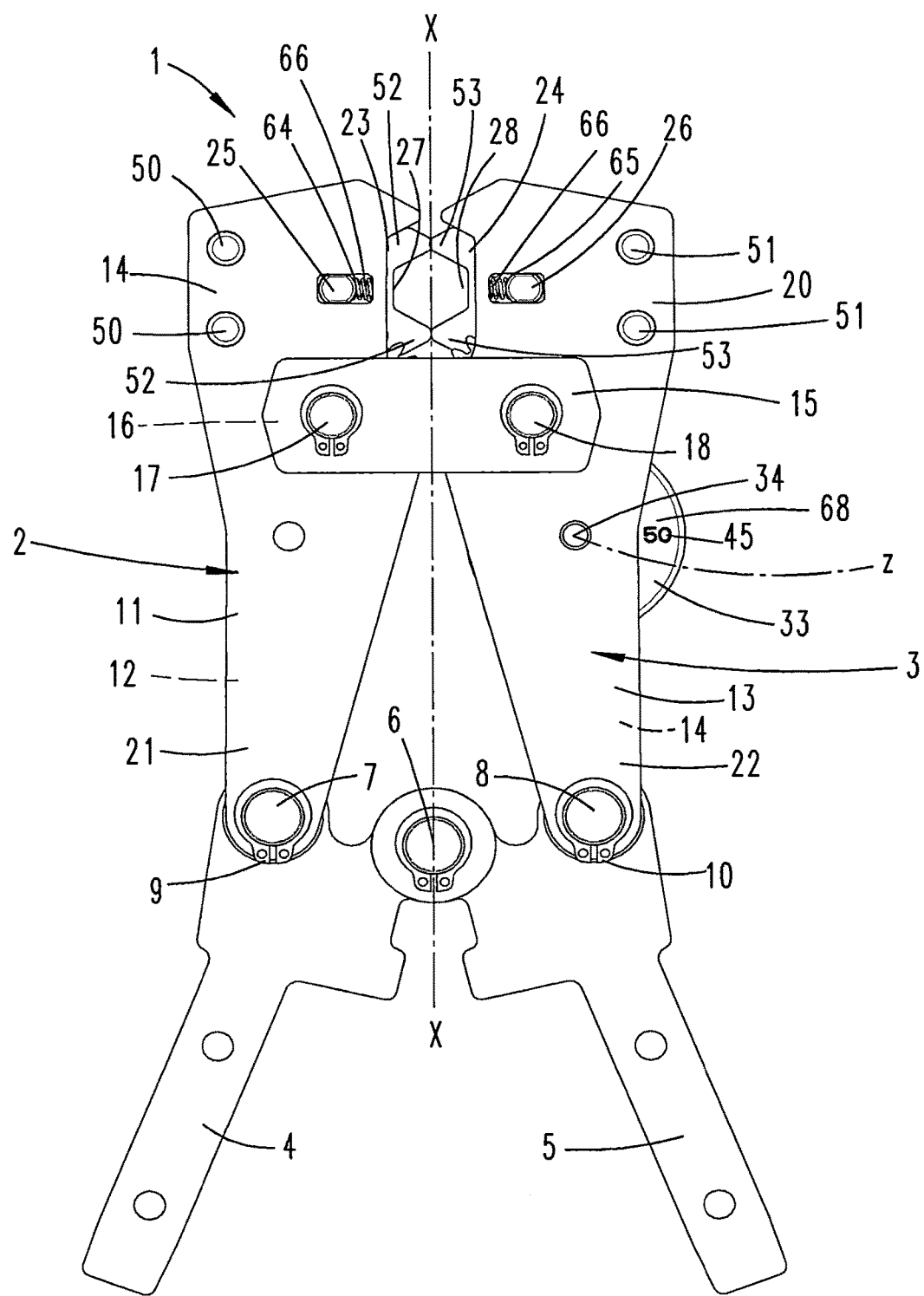

(51) Int. Cl.
*B25B 7/04* (2006.01)
*B25B 27/14* (2006.01)
*B25B 7/12* (2006.01)
*B25B 7/16* (2006.01)
*B25B 7/22* (2006.01)
*F16H 1/22* (2006.01)
*F16H 55/14* (2006.01)

(52) U.S. Cl.
CPC .............. *B25B 7/22* (2013.01); *B25B 27/146* (2013.01); *F16H 1/22* (2013.01); *F16H 55/14* (2013.01)

(58) Field of Classification Search
USPC ........................................................ 72/409.1
See application file for complete search history.

(56) References Cited

U.S. PATENT DOCUMENTS

| | | | |
|---|---|---|---|
| 3,733,627 A | | 5/1973 | Epstein |
| 4,677,702 A | | 7/1987 | Cairns |
| 4,825,682 A | | 5/1989 | Orav et al. |
| 7,536,896 B1 | * | 5/2009 | Hung ........................ B25B 7/04 29/751 |
| D796,927 S | * | 9/2017 | Konnecke ........................ D8/52 |

FOREIGN PATENT DOCUMENTS

| | | |
|---|---|---|
| DE | 8029841 U1 | 2/1981 |
| DE | 19628752 A1 | 1/1998 |
| DE | 20217733 U1 | 4/2004 |
| JP | H0518455 A | 1/1993 |
| JP | 2012101340 A | 5/2012 |
| WO | 2009114477 A2 | 9/2009 |

OTHER PUBLICATIONS

Written Opinion for corresponding International Patent Application No. PCT/EP2015/079599 dated Jun. 27, 2016, 20 pages.
Machine Translation for Foreign Patent Document No. 1 DE1465239A1.
Machine Translation for Foreign Patent Document No. 2 DE2841588A1.
Machine Translation for Foreign Patent Document No. 3 DE8029841U1.
Machine Translation for Foreign Patent Document No. 4 19628752A1.
Machine Translation for Foreign Patent Document No. 5 DE20217733U1.
Machine Translation for Foreign Patent Document No. 6 JP2012101340A.
Machine Translation for Foreign Patent Document No. 7 JPH0518455A.

* cited by examiner

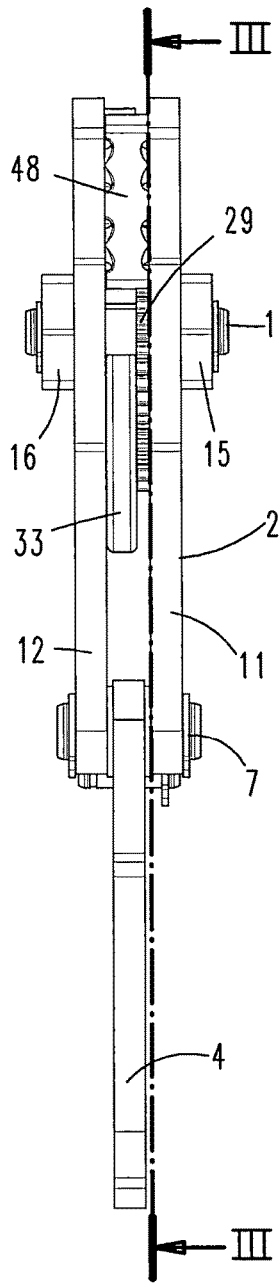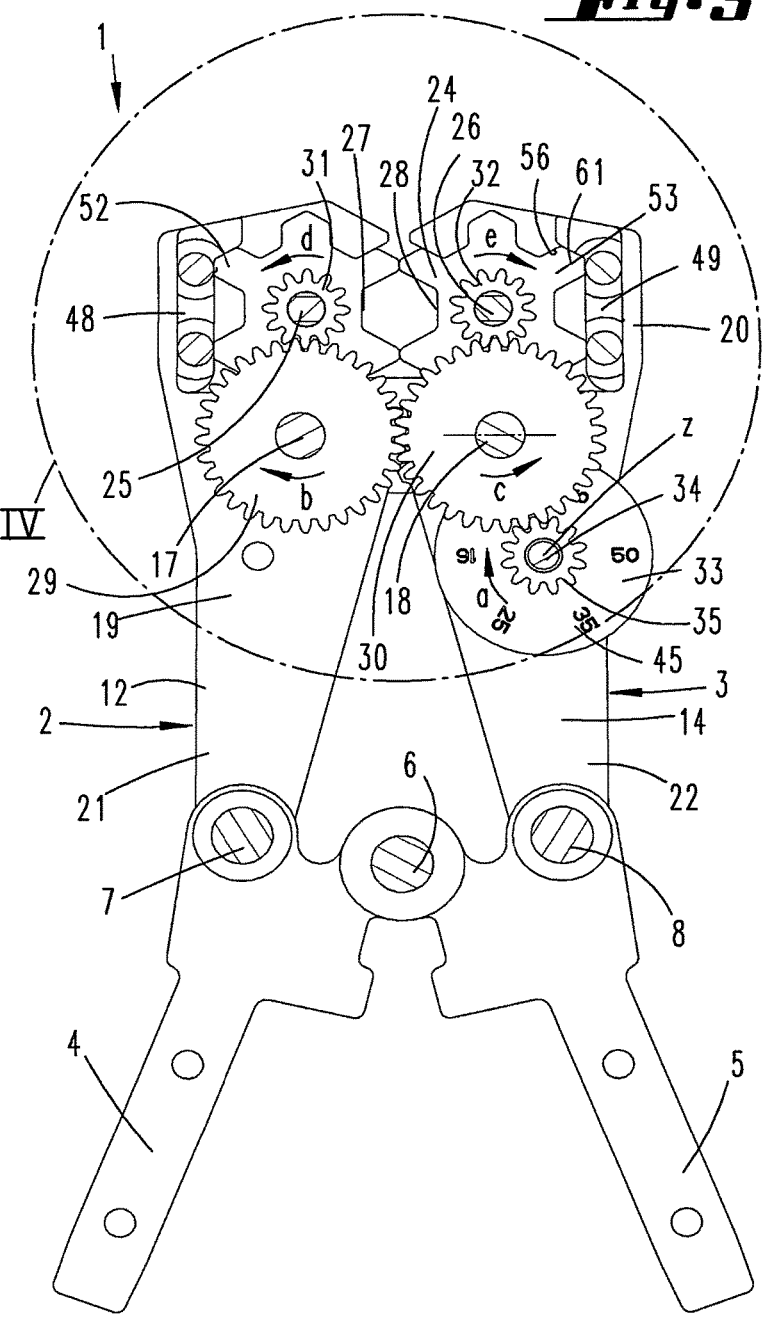

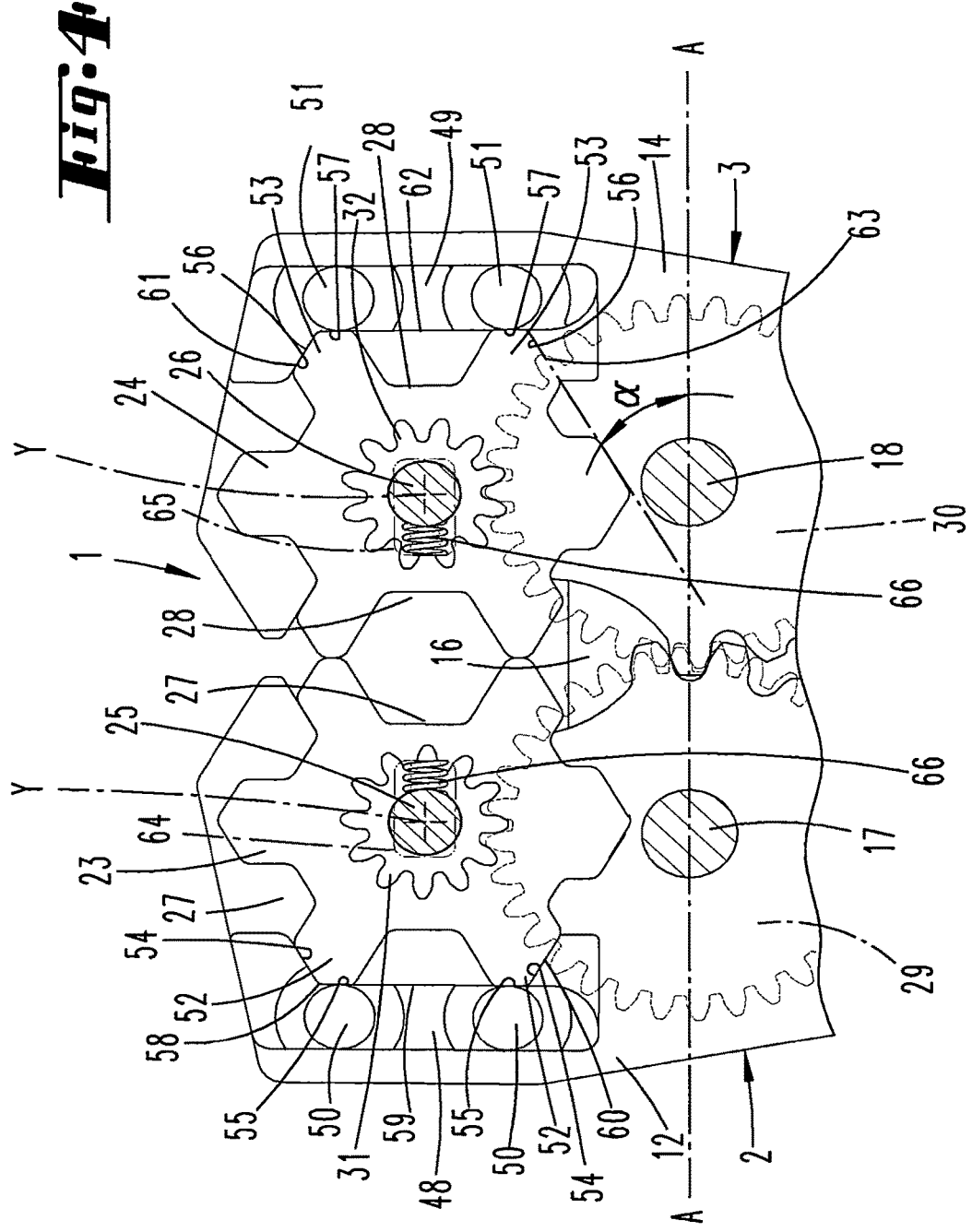

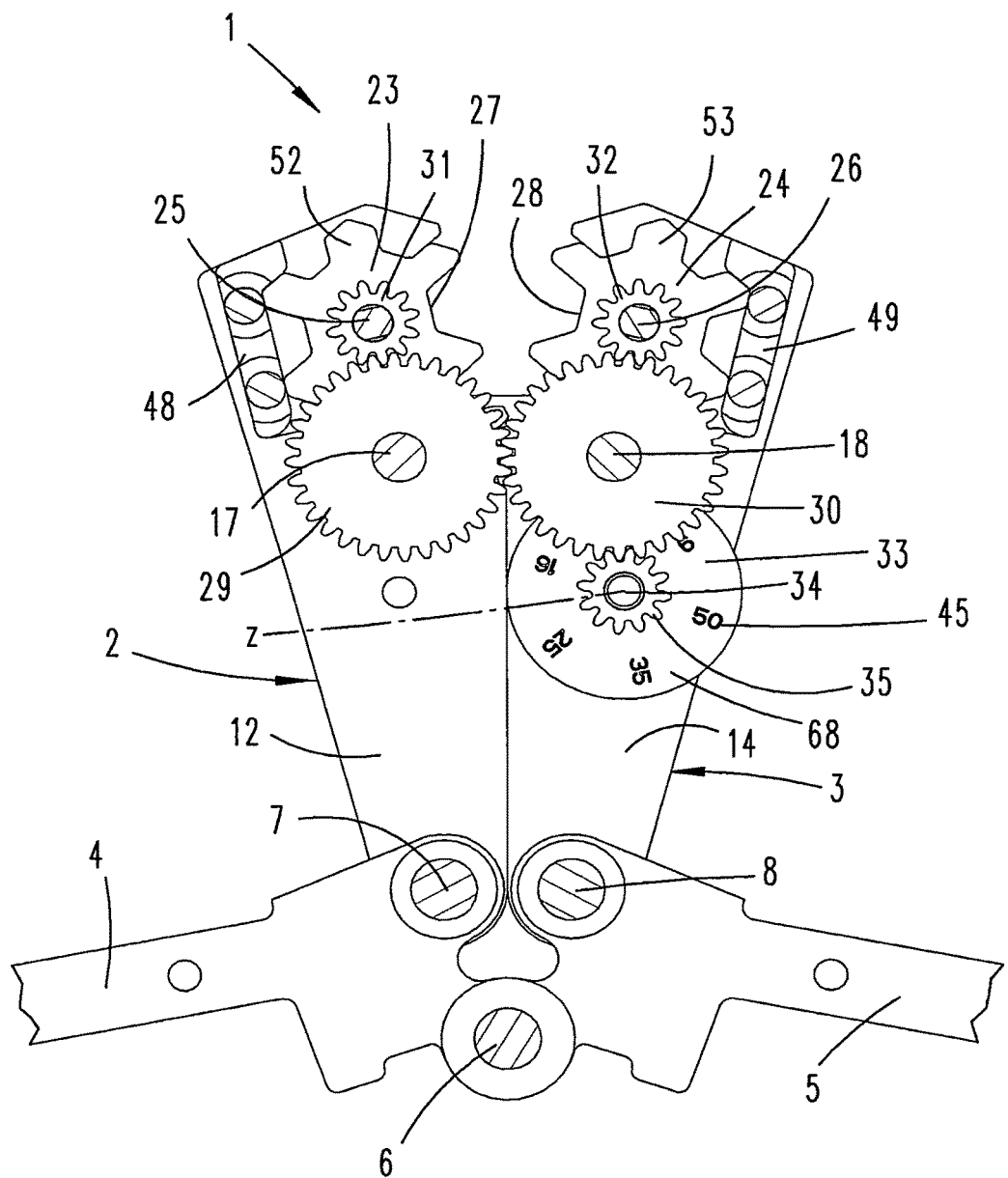

CRIMPING PLIERS, AND TOOTHED WHEEL HAVING TEETH

The invention initially relates to crimping pliers, in particular for crimping cable lugs or the like onto electrical conductors, comprising two crimping jaws which can be swiveled towards one another, wherein in each crimping jaw a crimping matrix configured with a plurality of different crimping dies over a circumference is rotatably mounted with respect to an axis of rotation.

Crimping pliers of the type in question are known, both as hand-operated and as motor-driven tools. These are used, for example, to fasten cable lugs onto electrical conductors. For this purpose, an in particular tubular workpiece is compressed between the two crimping jaws with for example hexagonal crimping dies of the crimping matrices. Usually in this case a different crimping profile, i.e. a different opening cross-section of the crimping dies of the two crimping matrices is required for each cable cross-section. In known pliers a corresponding adaptation of the crimping matrices is made by rotational displacement of the same about its axis of rotation, wherein the crimping dies of the two crimping matrices must be matched to one another for correct pressing of the workpiece.

Such crimping pliers are known for example from DE 19 628 752 B4. Known from U.S. Pat. No. 4,825,682 A is a crimping device configured as a standing device in which a crimping matrix is displaceable relative to another crimping matrix in a carriage-like manner and the displaceable crimping matrix can be subjected to force via a toggle lever. One of the crimping matrices must be released for rotation by withdrawing a retaining axis. The other crimping matrix should be retracted sufficiently far that the interlocking is cancelled and it can then be turned if required. Known from U.S. Pat. No. 2,838,970 A are crimping pliers in which a nut has to be loosened to release a crimping matrix and this can then turn. Thereafter it has to be re-inserted and the nut screwed tight again.

Known from U.S. Pat. No. 7,536,896 B1 are crimping pliers in which adjusting wheels are provided for the crimping matrices which are arranged on the same axis of rotation as the crimping matrix and are connected directly to the crimping matrix. An adjusting wheel and the crimping matrix have the same axis of rotation.

Known from JPH518455 A is a plastic toothed wheel in which different shapes extend in the manner of spokes freely between a hub and a circumferential edge which has tooth formations.

This object is solved in crimping pliers in which it is taken into account that the crimping matrices are permanently coupled via the gearing independently of a swivel position of the crimping jaws.

As a result of the coupling of the crimping matrices via gearing, the rotational adjustment of a crimping matrix for displacement of a desired crimping die into the working position automatically results in a corresponding adjustment of the other crimping matrix. The adjustment of the two crimping matrices takes place synchronously. The coupling gearing is in this case preferably designed so that crimping dies of the two crimping matrices pertaining to one another always enter into the respective working position during adjustment of a crimping matrix.

The coupling of the crimping matrices via gearing is preferably always achieved independently of the swivel position of the crimping jaws, i.e. preferably both in the maximum crimping jaw open position and also in the crimping jaw closed position and furthermore preferably also in each intermediate position between the open position and the closed position. The coupling of the crimping matrices is therefore not lost in the course of the swiveling displacement of the crimping jaws. The assignment of appurtenant crimping dies for the envisaged pressing preferably given via the coupling is therefore always retained preferably as far as an intentional change as a result of rotational displacement of a crimping matrix.

A gear ratio or gear reduction can be achieved via the coupling via gearing.

A matrix can be moved by means of a gear wheel transversely to the axis of rotation. As a result of the transverse displacement, an interlocking of the crimping matrix in the working position can be unlocked. Furthermore, a radial displacement of the crimping matrix in relation to the axis of rotation can be accompanied by the rotational displacement of the crimping matrix for adjusting another crimping die into the working position.

It can thus be further provided that a crimping matrix is movable by means of a gear wheel from a first crimping position protected by interlocking into a second crimping position protected by interlocking.

A crimping matrix can be adjusted to move another crimping die into a working position by means of a gear action against a force urging the crimping matrix into an interlocked working position accompanied by a movement transverse to its axis of rotation. The force which loads the crimping matrix into the interlocked working position can result from a spring acting indirectly or directly on the crimping matrix. This can comprise a usual cylinder spring in the manner of a compression or tension spring; alternatively for example also a leg spring. Furthermore, the force can also result from a resilient element in the form of an elastically resilient plastic or the like.

The coupling via gearing can be achieved via toothed wheels which are permanently in engagement. As a result of a preferred arrangement of such toothed wheels coaxially to the swivel axes of the crimping jaws, a permanent coupling of the toothed wheels can be achieved independently of the swivel position of the crimping jaws.

A permanent coupling via gearing can also be achieved by direct or indirect connection of the crimping matrices via a transmission belt, further in particular via at least one elastic belt.

The invention further relates to crimping pliers, in particular for crimping cable lugs or the like onto electrical conductors, comprising two crimping jaws which can be swiveled towards one another, wherein in each crimping jaw a crimping matrix configured with a plurality of different crimping dies over a circumference is rotatably mounted with respect to an axis of rotation and a position corresponding to a working position of a crimping die is protected by interlocking.

For the prior art, reference is made to the documents acknowledged initially.

Starting from this, it is the object in this respect to configure crimping pliers of the said type in a manner favourable to handling.

This object is solved whereby the crimping matrix is movable transverse to its axis of rotation to unlock the interlocked position and that the movement transverse to the axis of rotation is derived from a rotational displacement of the crimping matrix for unlocking the interlocked position.

In the solutions known from the prior art, the crimping matrices are displaced along their axis of rotation to unlock the interlocked position in order to be able to bring another crimping die into the working position thereafter as a result of a rotational displaceability of the crimping matrix, which is then released.

The proposed solution here envisages a radial movement of the crimping matrix in relation to the axis of rotation in order to unlock the interlocked position. This results in a more favourable handling. The movement transverse to the axis of rotation to unlock the interlocked position can be accompanied by the rotational displacement of the crimping matrix to adjust the crimping die. The transverse displacement can in this case be derived from the rotational displacement. The rotational displacement can force a translational displacement of the crimping matrix.

A crimping die of the crimping matrix is preferably formed by tooth-like projections, which tooth-like projections in particular flank the crimping die in the circumferential direction of the crimping matrix. Each projection can comprise an application surface on an outer side of the crimping die which can be brought into engagement with an interlocking means in a working position of a crimping die, wherein when viewed in the direction radial to an axis of rotation, the application surface brought into engagement with the interlocking surface encloses an acute angle with respect to a straight line running through the axes of rotation of the opposing crimping matrices or parallel thereto. This acute angle can for example be 5 to 45 degrees, further for example 15 to 30 degrees.

The application surface of the tooth-like projection preferably interacts with a corresponding interlocking surface of the interlocking means running at the same acute angle. Interlocking surface and application surface can abut against one another in the interlocked position, in particular abut flat against one another.

The interlocking means with the interlocking surface is preferably fastened fixedly and therefore not displaceably on the crimping jaw assigned to the crimping matrix.

The engaged application surface of a crimping die can pertain to an opposite crimping die located in the working position, in relation to the axis of rotation of the crimping matrix. A quasi-rearward interlocking support of the crimping matrix in the area of the interlocking means can thus be achieved. In the case of a crimping matrix which can be rotated for adjustment, a plurality of differently configured crimping dies are provided distributed over the circumference, which are spaced apart from one another in the circumferential direction by tooth-like projections.

Two opposite application surfaces can be provided in relation to the previously described straight lines. These application surfaces are preferably formed on the projections which delimit the crimping die in the circumferential direction, wherein the application surfaces can be arranged pointing away from one another in relation to the straight line.

In the case where two opposite application surfaces are formed, preferably two interlocking surfaces cooperating with these application surfaces are also provided.

The acute angles of the two application surfaces and/or two interlocking surfaces can also be the same.

As a result of a preferred rotational action on the crimping matrix, the application surface running in the direction of rotation of the crimping matrix slides on the assigned interlocking surface of the interlocking means. This results in a displacement of the crimping matrix in a direction transverse to its axis of rotation until the application surface leaves the interlocking surface and the interlocking engagement is thereby at least preliminarily unlocked.

The interlocking surface on which the matrix-side application surface can slide can form a sliding surface, for example in the form of a pointer slope, whereby the matrix can be brought into a stop-limited rotation end position or interlocked position during a rotation about its axis of rotation. In particular in cooperation with a spring force acting on the matrix in its base position, a possible undesired stay in the dead point position is counteracted. On the contrary, the matrix projection slides on the ascending or descending sliding surface in relation to a plan view, whereafter in particular due to spring force an automatic rotational displacement into the interlocked position is achieved.

The sliding surface can have a curved edge profile in relation to a plan view. The curve is calculated from the friction parameters of crimping matrix and interlocking surfaces of the interlocking means so that any self-inhibition as a result of this friction pairing is eliminated. The cooperating surfaces of crimping matrix and sliding surfaces meet at an angle (in relation to a plan view) which is preferably greater than 4 degrees.

Preferably two oppositely directed pointer slopes are provided which with reference to a plan view of the matrices and interlocking means in which plan view the matrix axes of rotation are represented as points, form a roof-like profile of the interlocking surface.

In particular if the two application surfaces and interlocking surfaces have the same angle, the previously described effect can be brought about in both directions of rotation of the crimping matrix. An adjustment direction of rotation for the crimping matrix can be predefined by varying the acute angle of one of the two application surfaces and/or one of the two interlocking surfaces, in particular to a more acute angle, furthermore as far as a parallel alignment to the straight line.

A crimping matrix can be moved out of the interlocked position for adjustment only against spring force. At least this spring force must be overcome for adjustment of the crimping matrix.

The spring force preferably acts transversely to the alignment of the axis of rotation of the crimping matrix on the crimping matrix or a pin or the like guiding the crimping matrix. The spring acts here in such a manner that the crimping matrix is urged directly or indirectly into the interlocking position.

The spring force and/or the acute angle in the area of the application surface and/or the interlocking surface can be selected so that an adjustment of a crimping matrix by hand is made possible, i.e. in particular a translation-free rotational displacement of the crimping matrix as a result of manual action on the crimping matrix or an adjusting part connected directly to the crimping matrix.

The spring force and/or the acute angle can also be selected so that only a gear adjustment is made possible. In such a gear adjustment, a gear ratio is preferably provided so that larger spring forces and/or frictional forces between the application surface and the interlocking surface can be overcome with conventional manual force.

In addition, the invention relates to crimping pliers, in particular for crimping cable lugs or the like onto electrical conductors, comprising two crimping jaws which can be swiveled towards one another, wherein in each crimping jaw a crimping matrix configured with a plurality of different crimping dies over a circumference is rotatably mounted with respect to an axis of rotation, and wherein symbols in particular numbers are provided, which characterize the different crimping dies.

With regard to the symbols, these usually comprise pressing nominal widths of the assigned crimping dies. In this respect, it is known to engrave these symbols directly into the crimping matrices, for example, in the area of tooth-like protections flanking the crimping dies.

In order to configure the crimping pliers of the type in question more favourably in particular from the production technology viewpoint, it is provided in one inventive idea that the symbols are applied to a part which is separate from the crimping matrix, which is not exposed to any crimping force during a pressing and consists of a different material from the material of the crimping matrix.

The usual engraving of the symbols in the highly loadable crimping matrices proves to be expensive. Frequently these symbols are engraved by hand. The arrangement of the symbols on a part which is separate from the matrix and which is not exposed to the crimping force during pressing affords advantages in particular in the choice of the part material and also in the choice of application of the symbols to the part. The material can be selected to be lower-quality than the crimping matrix. Thus, for example, the part can for example consist of a usual steel material, but furthermore also for example of aluminium, plastic as far as board or paper.

The symbols can be printed onto the separate part in the simplest manner. The symbols can for example also be glued on as self-adhesive film.

The separate part can be firmly connected to the crimping matrix. Thus, the separate part can for example be adhesively bonded or screwed to the crimping matrix.

In one embodiment, the separate part can be arranged coaxially to the crimping matrix, this for example in the case of a disk-like configuration of the separate part.

The separate part with the symbols pertaining to the crimping die in the working position can project visibly over a free edge of the associated crimping jaw. Also, in particular in the region of the crimping jaw, a window-like cut-out can be provided through which the symbol is visible.

Furthermore, the separate part can be arranged about a further axis of rotation separate from the axis of rotation of the crimping matrix and can be connected to the crimping matrix via gearing. For example, the separate part can at the same time be a hand wheel for adjustment of the crimping matrix.

When forming a permanent coupling via gearing between the crimping matrices, only a separate part can be provided with symbols. Since the crimping matrices are in this case turned synchronously into the working position and therefore appurtenant crimping dies always lie facing one another in the working position, only one symbol display is necessary.

In addition to printing the symbols on a separate part, an integral formation of the symbols with the separate part can also be provided, this for example as a result of stamping into a separate part made of a metal material or further for example during manufacture of the separate part in a plastic injection moulding method. In a preferred configuration of the separate part as a zinc die cast component, the symbols can be introduced simultaneously in the casting technique.

Furthermore, the invention relates to crimping pliers having the features of the preamble of claim 1.

In order to configure such crimping pliers more favourably in particular in terms of handling, it is proposed that each crimping matrix is adjustable by means of an adjusting wheel coupled to this via the gearing, wherein the adjusting wheel and the crimping matrix have different axes of rotation.

Each crimping matrix can be adjusted via an adjusting wheel assigned in each case for displacement of a crimping die into the working position. The action by the user, in particular by the hand of the user can thus take place at a distance from the crimping matrix. The adjusting wheel is connected to the crimping matrix via gearing. A direct action of the adjusting wheel on the crimping matrix can be provided here. A gear reduction or gear ratio can also be provided.

The adjusting wheel can have numbers, in particular numerals for marking the crimping die in the working position.

The axes of rotation of adjusting wheel and crimping matrix preferably run parallel to one another, in particular parallel to one another with an offset.

Each crimping jaw has an extension in the longitudinal direction, starting from a hinge of the crimping jaw on the associated handle as far as the free end associated with the crimping matrix. The axes of rotation of crimping matrix and adjusting wheel of a crimping jaw can be arranged offset with respect to one another in this longitudinal direction.

The adjusting wheel can act directly on the crimping matrix for example by forming the adjusting wheel and the crimping matrix or by forming partial sections of the same as friction wheels or toothed wheels. A coupling via gearing by means of a friction belt is also possible.

Preferably the adjusting wheel acts on the crimping matrix via a gear wheel. The gear wheel is interposed via gearing. A gear reduction or gear ratio can also be achieved hereby.

Furthermore, the crimping matrix can be rotatable about a fixed axis of rotation, i.e. in particular not displaceable transversely to the geometrical transverse axis.

The crimping matrix can also be secured in a crimping position by a positive interaction with a spring. The found or set crimping matrix position is accordingly preferably protected by interlocking. For this purpose, a spring can be provided which interacts indirectly or, as preferred, directly with the crimping matrix. The projections protruding radially to the axis of rotation of the crimping matrix form application surfaces on the circumferential side against which in a preferred embodiment the spring comes to positive interaction. It is only possible to twist the crimping matrix from the crimping position by overcoming the spring force. By overcoming the spring force, the spring or a spring leg of the spring is in particular deflected by a projection of the crimping matrix.

The spring can be a wire spring, in particular a leg spring. Preferred in this respect is a leaf spring which with a broad side enters into the crimping position against one or more projection-side application surfaces of the crimping matrix.

In a further embodiment, the leaf spring can be supported on the axis of a gear wheel. The leaf spring can be bent about this axis of the gear wheel to apply the spring force. This bending region of the leaf spring is provided at least approximately centrally of a longitudinal extension of the leaf spring. A free end region of the leaf spring acts against the crimping matrix. The other free end region of the leaf spring is preferably held in the region of the associated crimping jaw.

In crimping pliers of the type described initially, in a further independent inventive idea, a gauge part is provided which is adapted to an outer contour of the crimping matrix in the region of a crimping die and only allows a closure of the crimping pliers, when the crimping matrix is arranged with an alignment of a crimping die in the crimping pliers suitable for a pressing.

As a result of a possible incorrect operation during adjustment of the crimping matrix to use a different crimping die, it can occur that the crimping matrix does not reach its final, possibly latch-secured position but a position which is rotated slightly with respect to this. This can result in damage to the crimping matrix during a subsequent pressing. Such an incorrect operation is counteracted by the proposed solution.

The gauge part is adapted in the interaction region with the crimping matrix or matrices to the outer contour of the same, preferably outside the crimping dies. If the crimping matrix is not correctly aligned, in the course of the pliers closing movement a projection extending in the circumferential direction between two crimping dies has a blocking and/or guiding action against a flank of the gauge part.

Thus, if the crimping matrix is not correctly aligned, a flank of the gauge part can have a blocking action in the swivel path of a crimping matrix projection so that the pressing position cannot be reached in this crimping matrix position.

Also the flank of the gauge part can be aligned so that a forced control of the crimping matrix is achieved whilst the matrix projection runs along the flank in order to at least displace a crimping die adjacent to the projection into a working position.

The gauge part can be configured as a plate part. Further, in a basic outline in which the geometrical axes of rotation of the crimping jaws are shown as points, the gauge part can be formed as triangular, wherein a triangle apex in the basic outline is preferably contour-adapted to the facing outer contour of the projections which delimit the crimping dies of both crimping matrices on one side.

The material thickness viewed perpendicular to the surface extension of the plate part can correspond to the material thickness of a crimping matrix viewed in the same direction.

Furthermore, the gauge part preferably extends in a plane receiving the two crimping matrices at the same time.

Furthermore, the gauge part can be mounted on the swivel axes of the crimping jaws. Thus, the gauge part can have axial pins passing through it. In the case of a possible triangular basic outline configuration of the gauge part, these axes or axial pins are preferably each assigned to a corner region.

In another independent solution approach but which can also be combined with the features of the further claims, it is proposed that the crimping matrices are permanently coupled via the gearing independently of a swivel position of the crimping jaws and/or one or both of the crimping matrices are adjustable by means of an adjusting wheel optionally with an interposed gear wheel and that a gear wheel and/or the adjusting wheel is formed completely or partially as elastically yieldable.

As a result of this configuration, any damage to the crimping pliers, in particular one or both crimping matrices and/or components in the operative position therewith in the case of a possible incorrect position of the crimping matrices with respect to one another in the course of a crimping jaw closing movement is counteracted. The forces acting here on the crimping matrices and/or on the gear wheel or wheels or the adjusting wheel do not result in any damage to the adjusting and/or pressing components as a result of the resilient configuration of the gear wheel and/or the adjusting wheel. In the case of a corresponding action of force as a result of an incorrect position of the crimping matrices, gear wheel and/or adjusting wheel deviate entirely or in the form of a subsection substantially in the direction of the action of force. Toothed wheels can thus also be brought into an out-of-engagement position or overrun position. As a result of the preferred elasticity, when the action of force ceases, an automatic resetting of gear wheel and/or adjusting wheel into the original functional position can be achieved.

The elastic resilience can, for example, be achieved by a substantially cushioned support of the gear wheel and/or adjusting wheel, further for example an axial body of such a wheel, in the direction of the action of force. The gear wheel and/or adjusting wheel can also consist of an elastically compliant material such as for example rubber.

In addition, the gear wheel and/or the adjusting wheel can have teeth, whereby gear wheel and/or adjusting wheel act in the form of a toothed wheel, wherein one or several groups of two or more teeth are formed, wherein further the teeth of one group are formed on a common retaining part and the retaining part is connected to a radially inner region of the gear wheel or adjusting wheel via a single spring-loadable branch.

A further solution proposal which can be viewed both independently and also combined with the features of the further claims provides that the crimping pliers have a determination part for determining a diameter of an electrical conductor on which crimping is to be carried out and that the determination part has a multiplicity of passage openings with respectively one narrowest cross-section which corresponds to a nominal diameter of an electrical conductor.

It is thus possible to classify the conductor to be crimped with regard to the size and crimping die of the crimping matrices to be selected thereafter. For this purpose a gauge-like determination part can be provided. This can consist of a hard plastic but alternatively also of a metal material. The passage opening matching the conductor diameter gives the user an indication of the crimping dies to be set. Thus, the determination part can have corresponding markings assigned to the passage openings, for example in the form of diameter designations or crimping die designations.

The determination part can always be freely accessible for use on the crimping pliers. Preferred is a fold-out arrangement of the determination part on the crimping pliers so that the determination part can be pivoted from a usage position into a non-usage position when not in use. The non-usage position can be a concealed position.

A relevant pivot axis of the determination part can be aligned to run parallel to the axes of rotation of the crimping matrices.

The determination part can also be arranged to overlap a jaw plate of a crimping jaw. The determination part can be brought out of this overlap position into the usage position as a result of swiveling.

Preferably two jaw plates are arranged to overlap one another, wherein the determination part can be arranged between the jaw plates in particular in the non-usage position.

If one crimping jaw is provided with an adjusting wheel for the synchronous adjustment of the crimping matrices, the other crimping jaw can be provided with the swing-out determination part.

The passage openings of a determination part can be configured for inch-based cable sizes or also for those which are metric-based.

The invention also relates to a toothed wheel having teeth, wherein one or more groups of two or more teeth are formed, wherein further the teeth of one group are formed on a common retaining part and the retaining part is connected via a single spring-loadable branch to a radially inner region of the toothed wheel.

Toothed wheels of the type in question are known. Reference is made for example to DE 397 646. The branch having the group of teeth is able to deviate in the circumferential direction under appropriate action of force.

In view of the known prior art, a technical problem of the invention can be seen in further improving a toothed wheel of the type in question in particular with respect to the elastic resilience of the teeth.

This problem is initially and substantially solved whereby the branch is connected to the retaining part off-centre in the circumferential direction. As a result of this off-centre arrangement, in addition to a resilient deviation in the circumferential direction, a resilient deviation in the radial direction (in relation to the axis of rotation of the toothed wheel) can also be achieved, this even in the case of a central application, further in particular in the case of a strictly radial application of the retaining part.

The open-edge slots flanking the respective spring-mounted branch extend over a radially greater length than tooth gaps obtained in the circumferential direction between two teeth.

Such a toothed wheel can be produced in laser cutting technology. As a result of the spring-mounted connection of a group of teeth to the radially inner region, an elastic resilience of this group of teeth can be achieved under appropriate action of force. The connecting branch acts in the manner of a spring leg.

Preferably with reference to a plan view of the toothed wheel, the branch is configured to run in a circular segment shape, therefore at least approximately in the manner of a leaf spring. The branch can also be connected to the retaining part off-centre in the circumferential direction, this in particular in relation to an extension of the retaining part in the circumferential direction of the toothed wheel.

Preferably three, four or more teeth are formed on the retaining part. Further preferably several groups each of four teeth, further preferably eight groups, are obtained on the toothed wheel.

The teeth of all the groups of a toothed wheel in the relaxed position of the branches carrying the retaining parts yield a uniform circumferential toothed structure along a circular line.

The previously described features can be important both by themselves and also combined with one or more of the further features.

The ranges or value ranges or multiple ranges specified hereinbefore and hereinafter include all intermediate values with regard to the disclosure, in particular in 1/10 steps of the respective dimension, optionally therefore also dimensionless. For example, the information 5 to 45 degrees also includes the disclosure of 5.1 to 45 degrees, 5 to 44.9 degrees, 5.1 to 44.9 degrees, 6.8 to 37.2 degrees etc. This disclosure can on the one hand serve to limit a said range limit from below and/or above, but alternatively or additionally for the disclosure of one or more singular values from a respectively given range.

Figure 6:
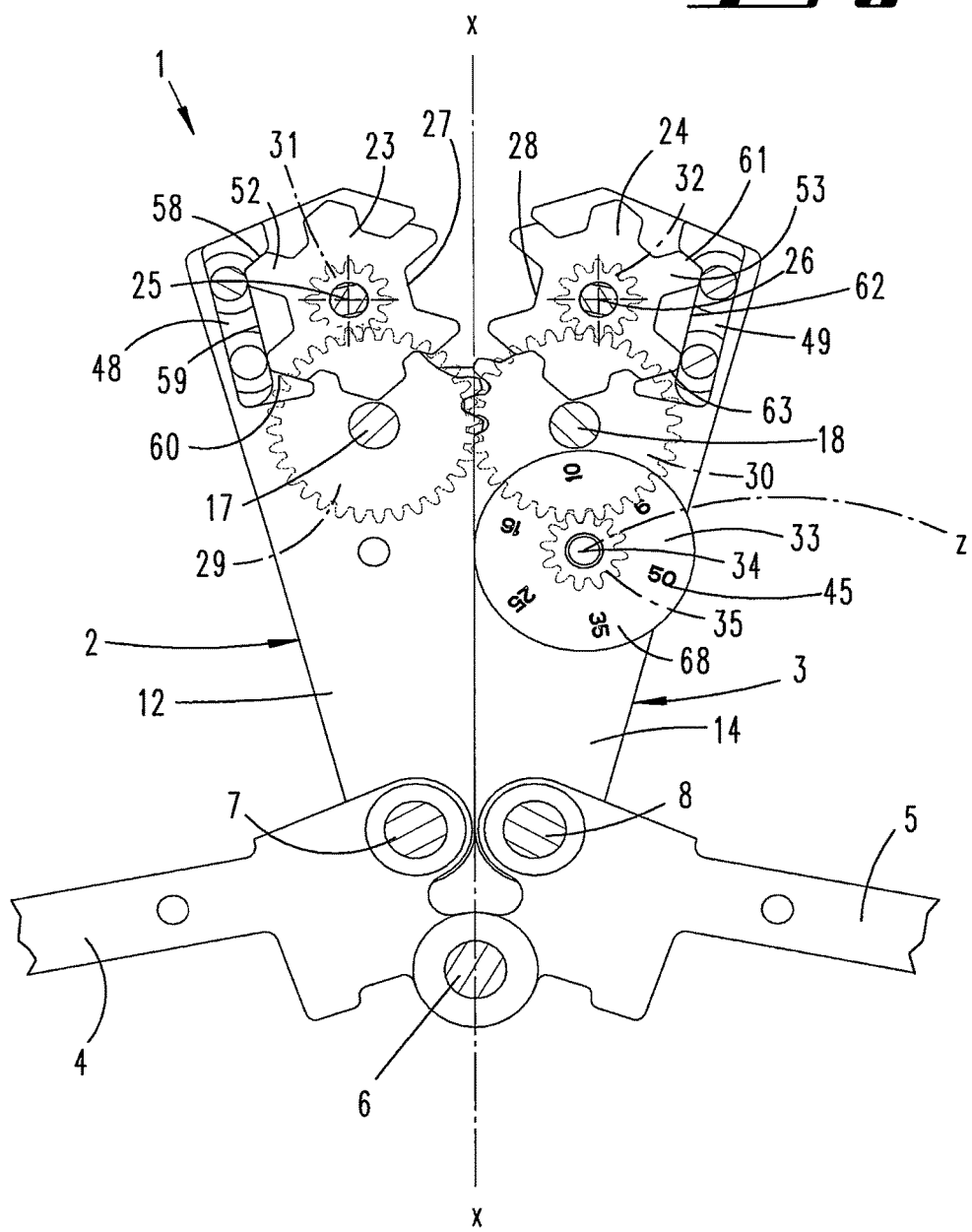
Figure 7:
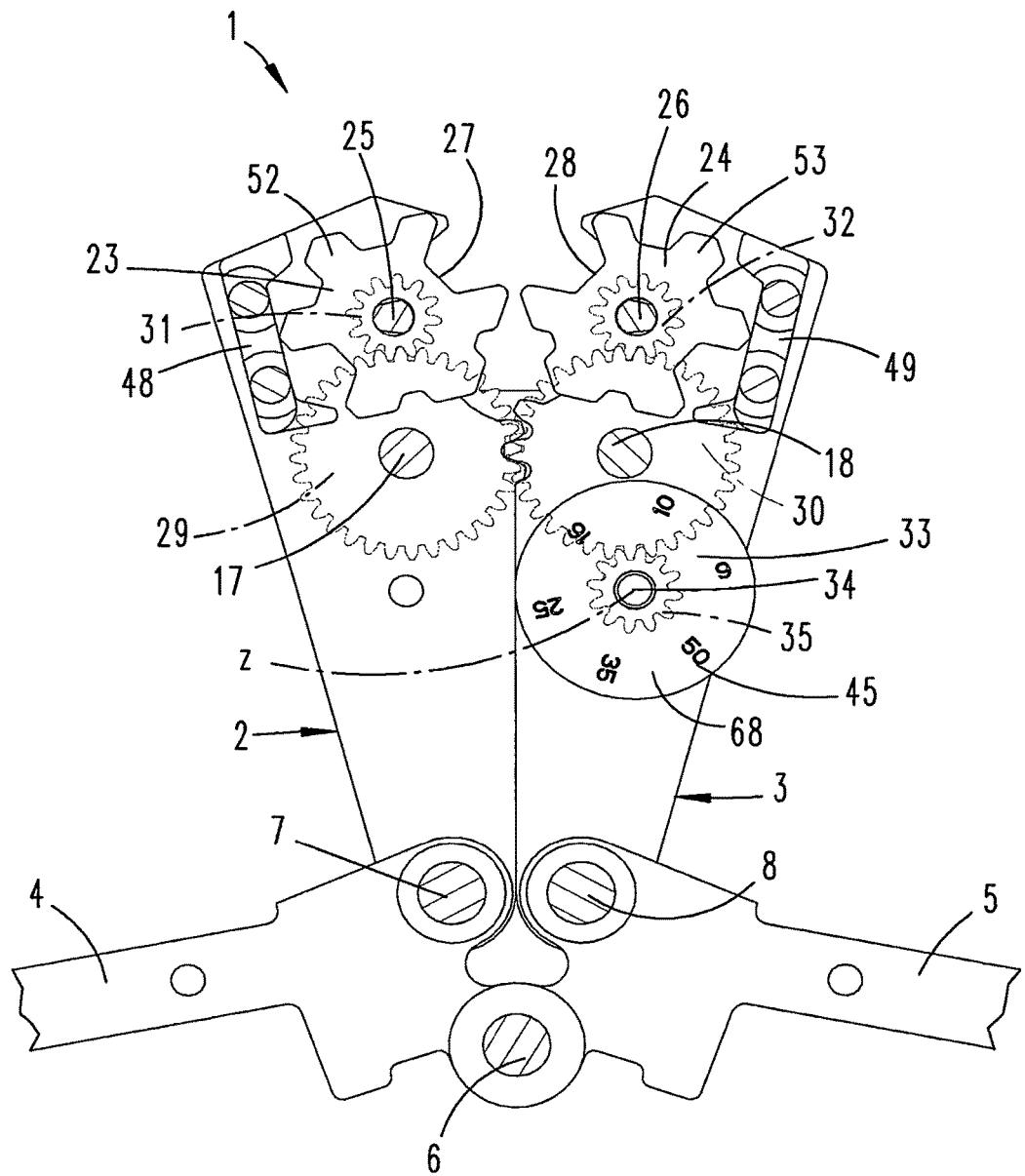
Figure 8:
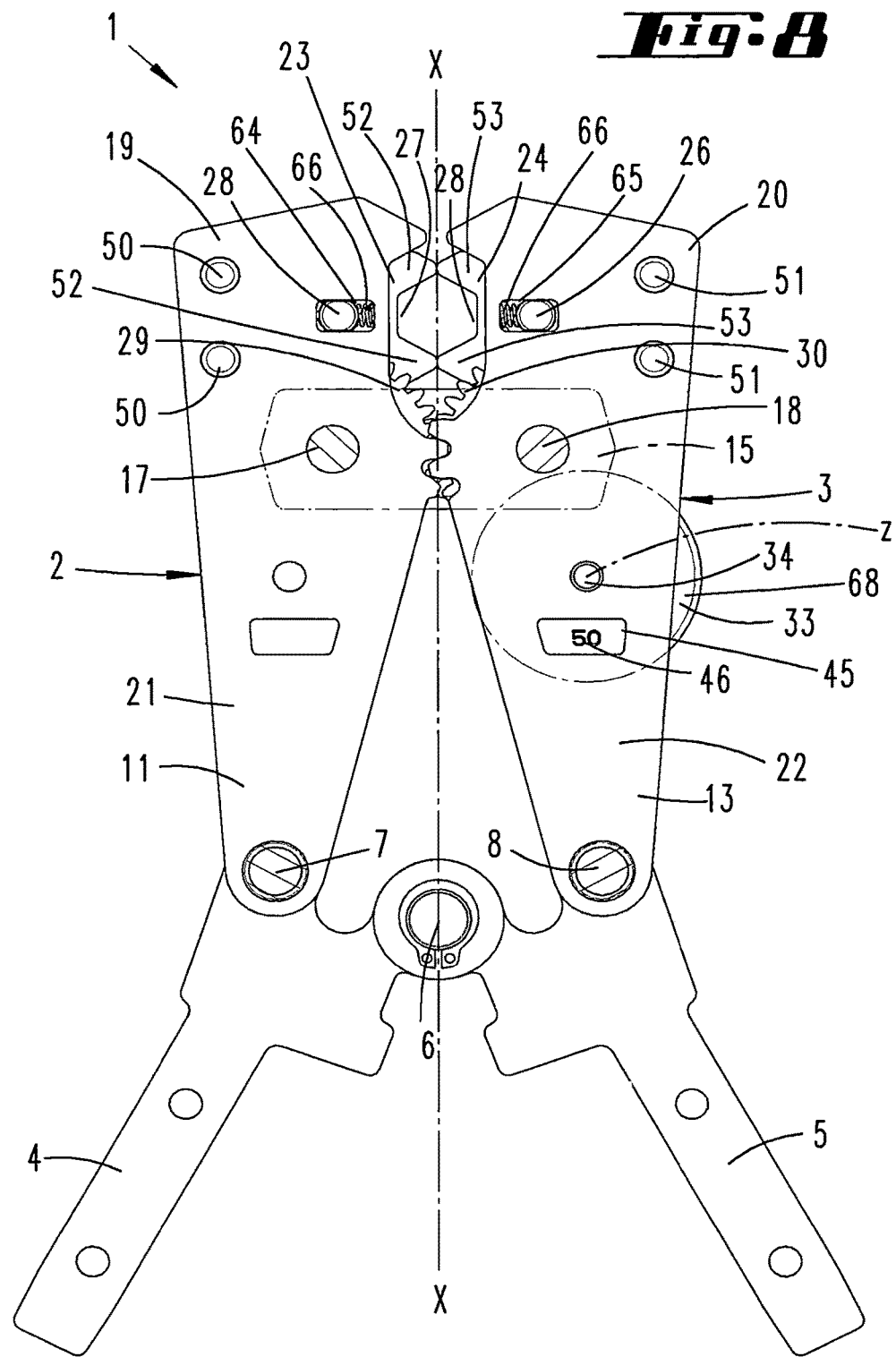
Figure 9:
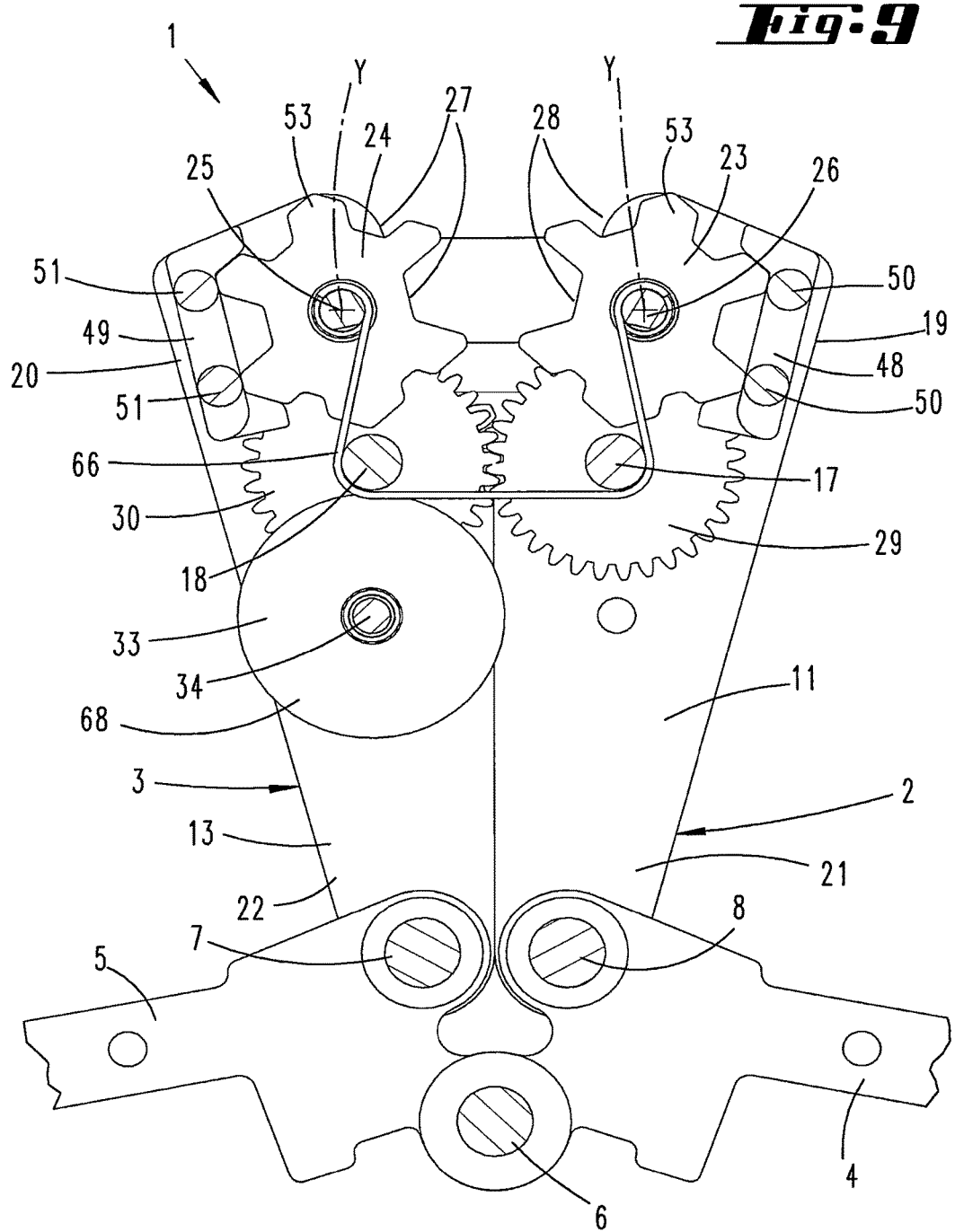
Figure 10:
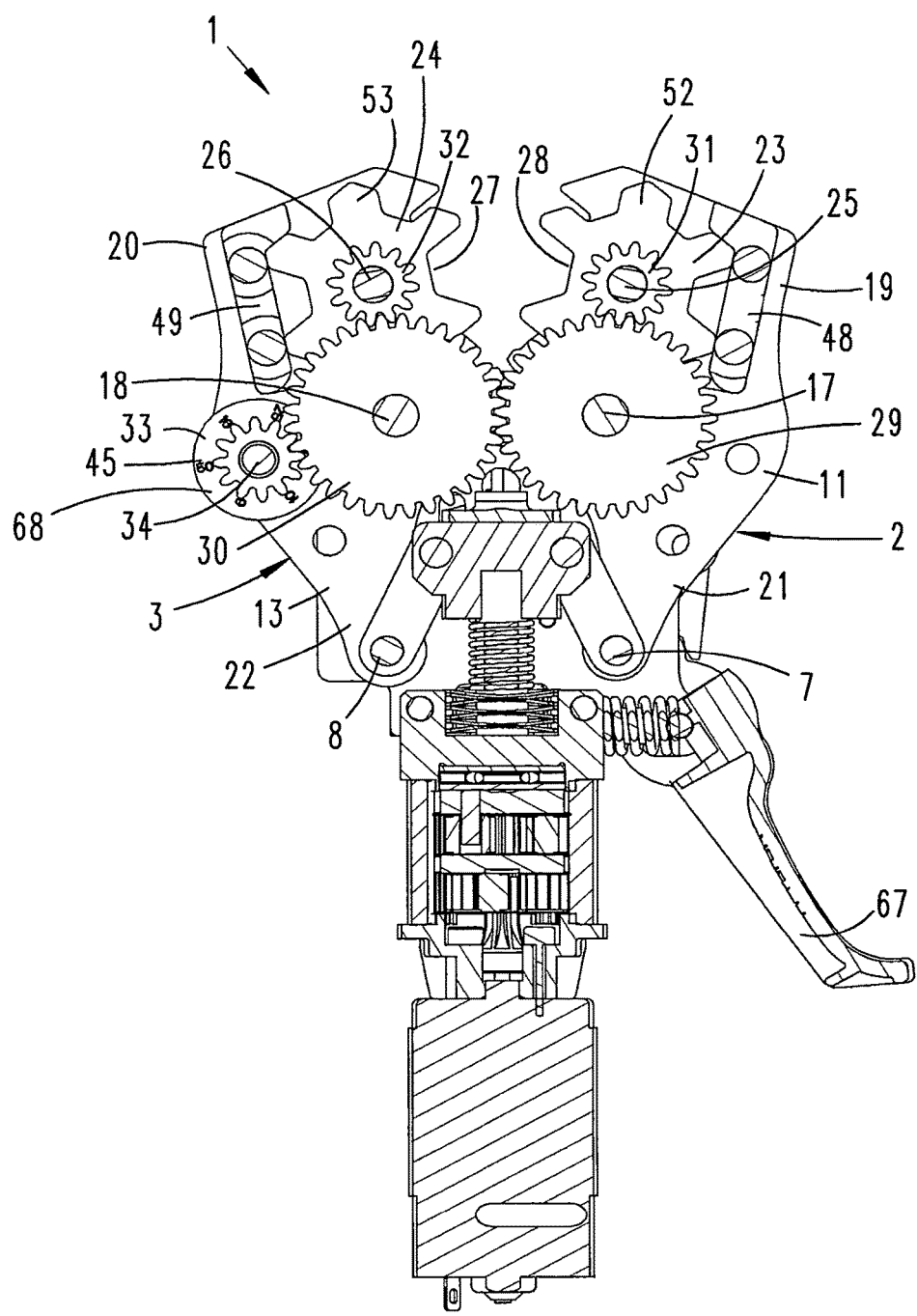
Figure 11:
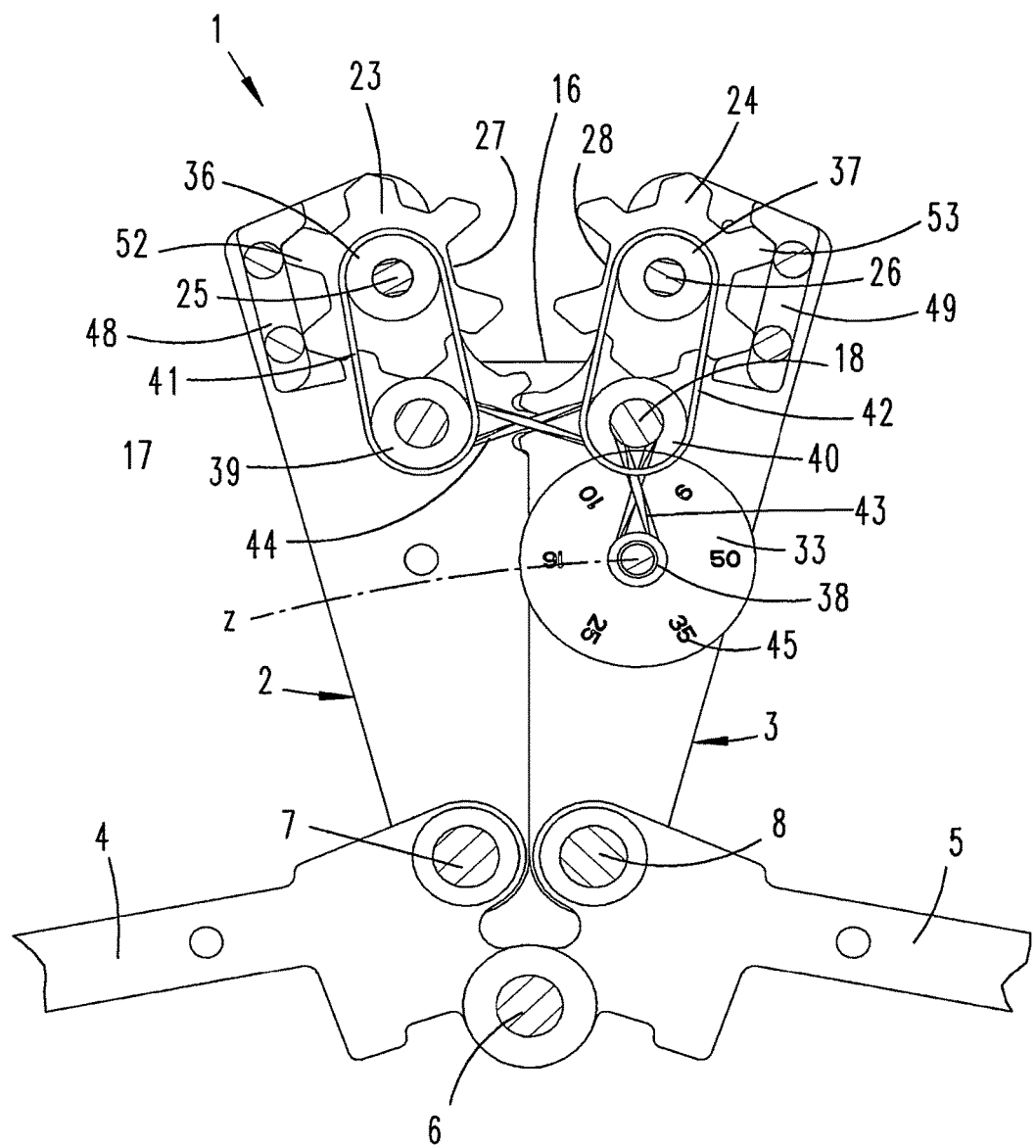
Figure 12:
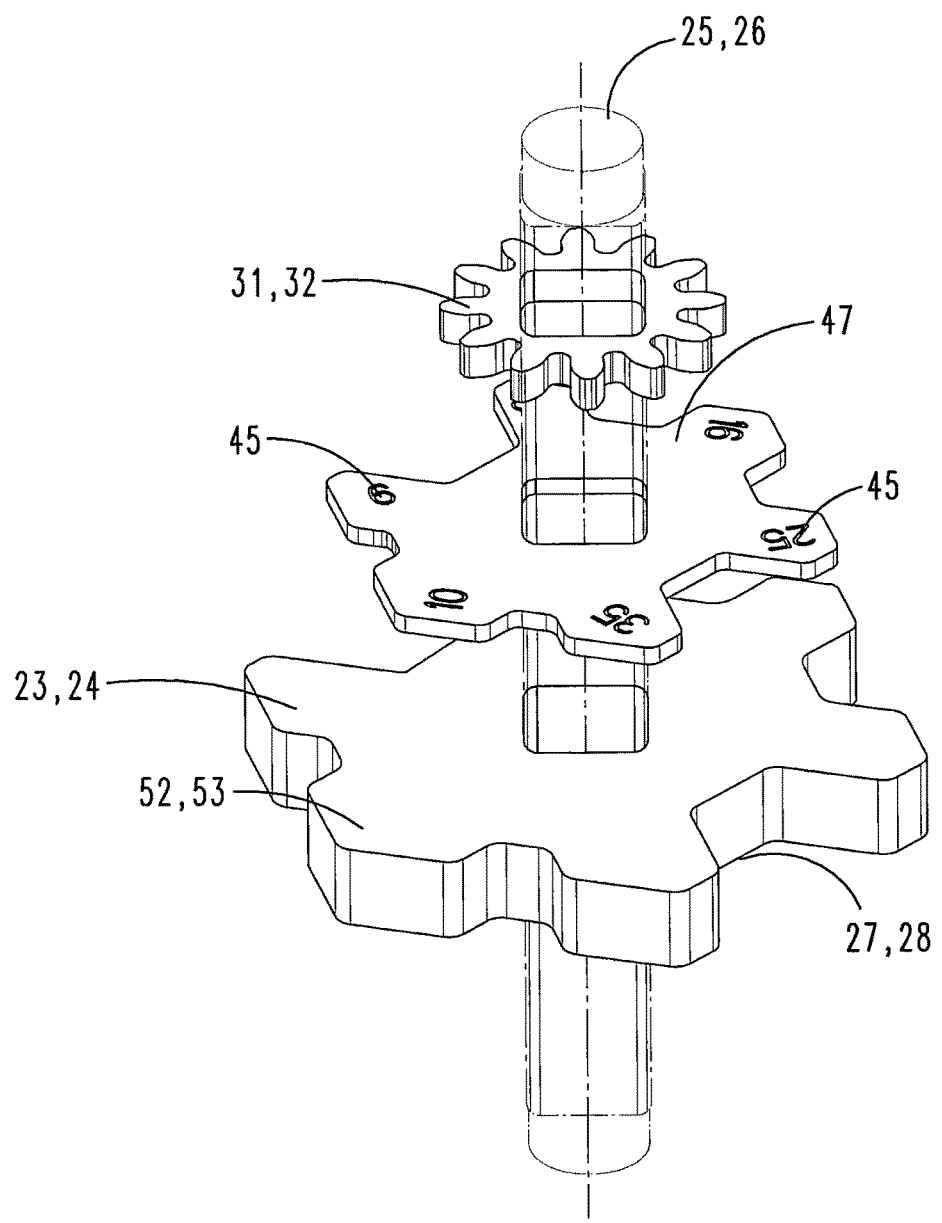
Figure 13:
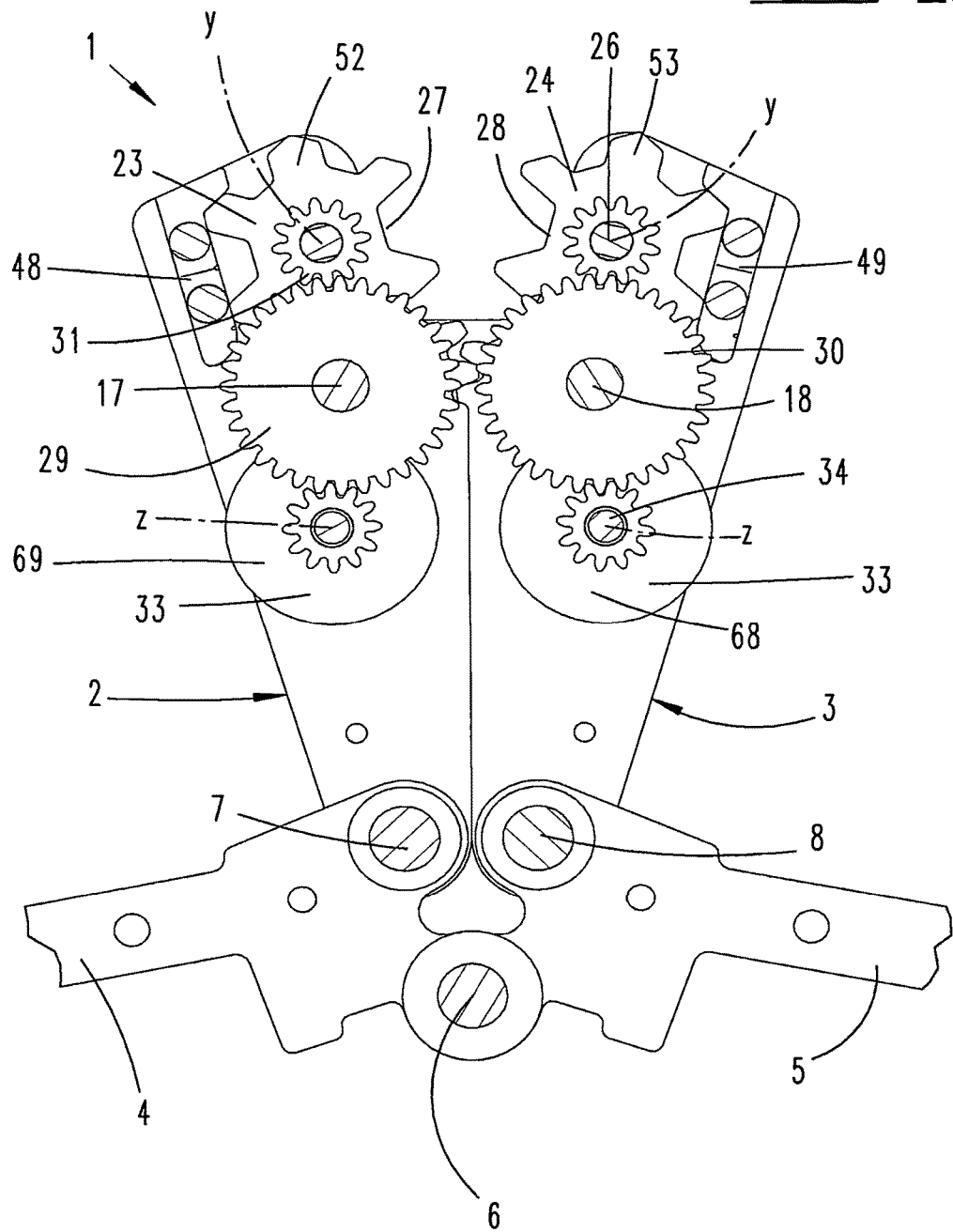
Figure 14:
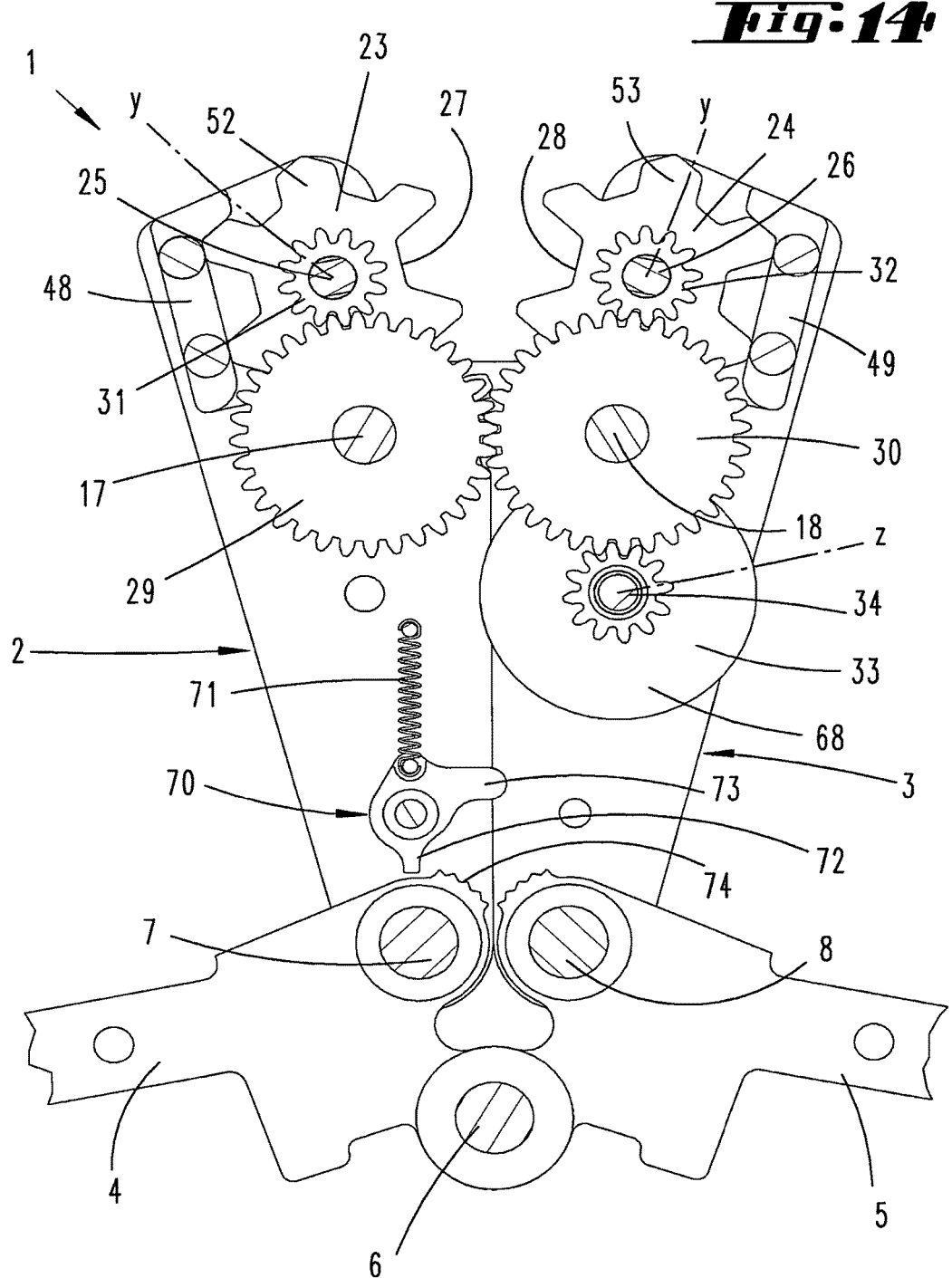
Figure 15:
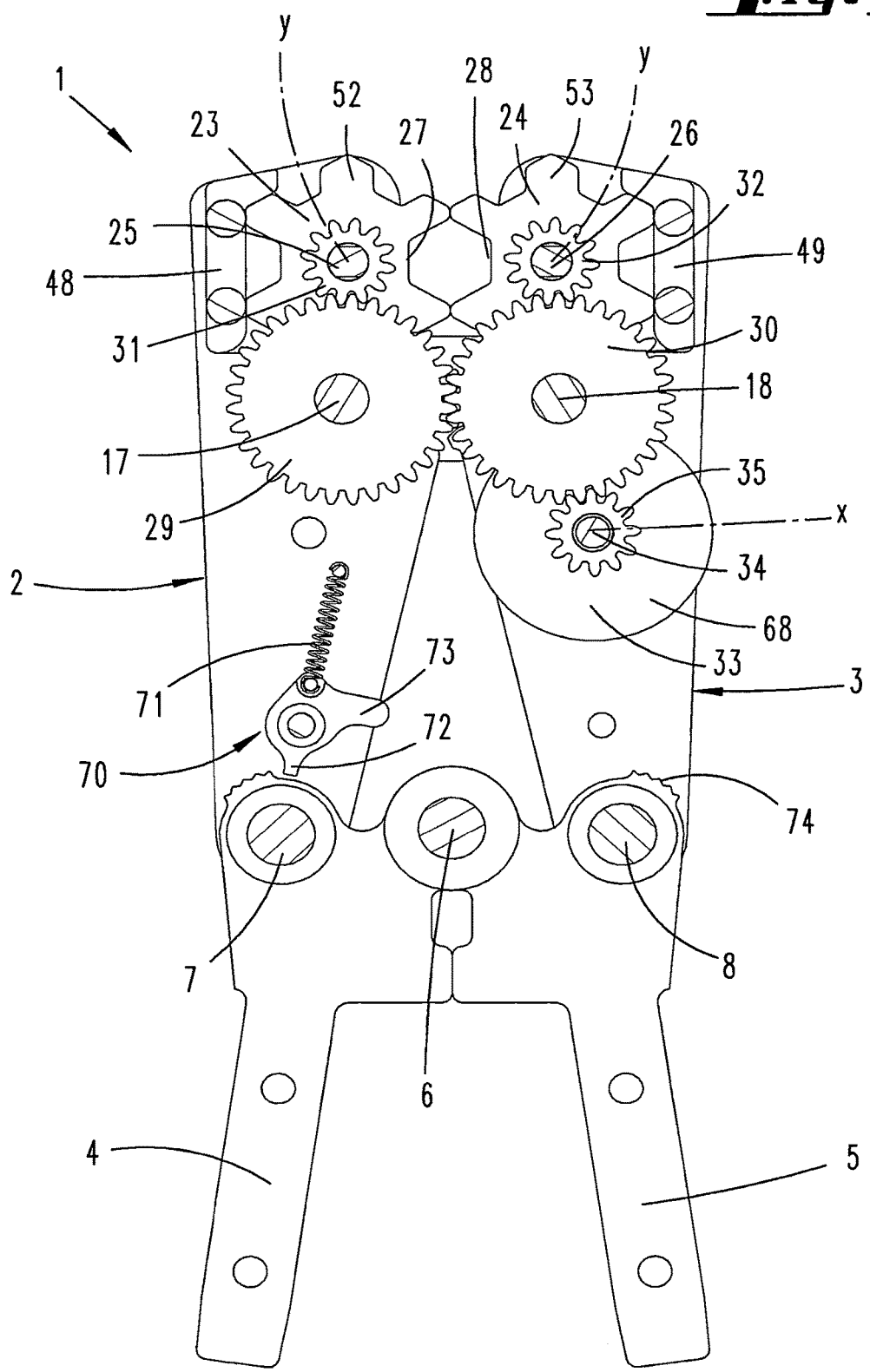
Figure 16:
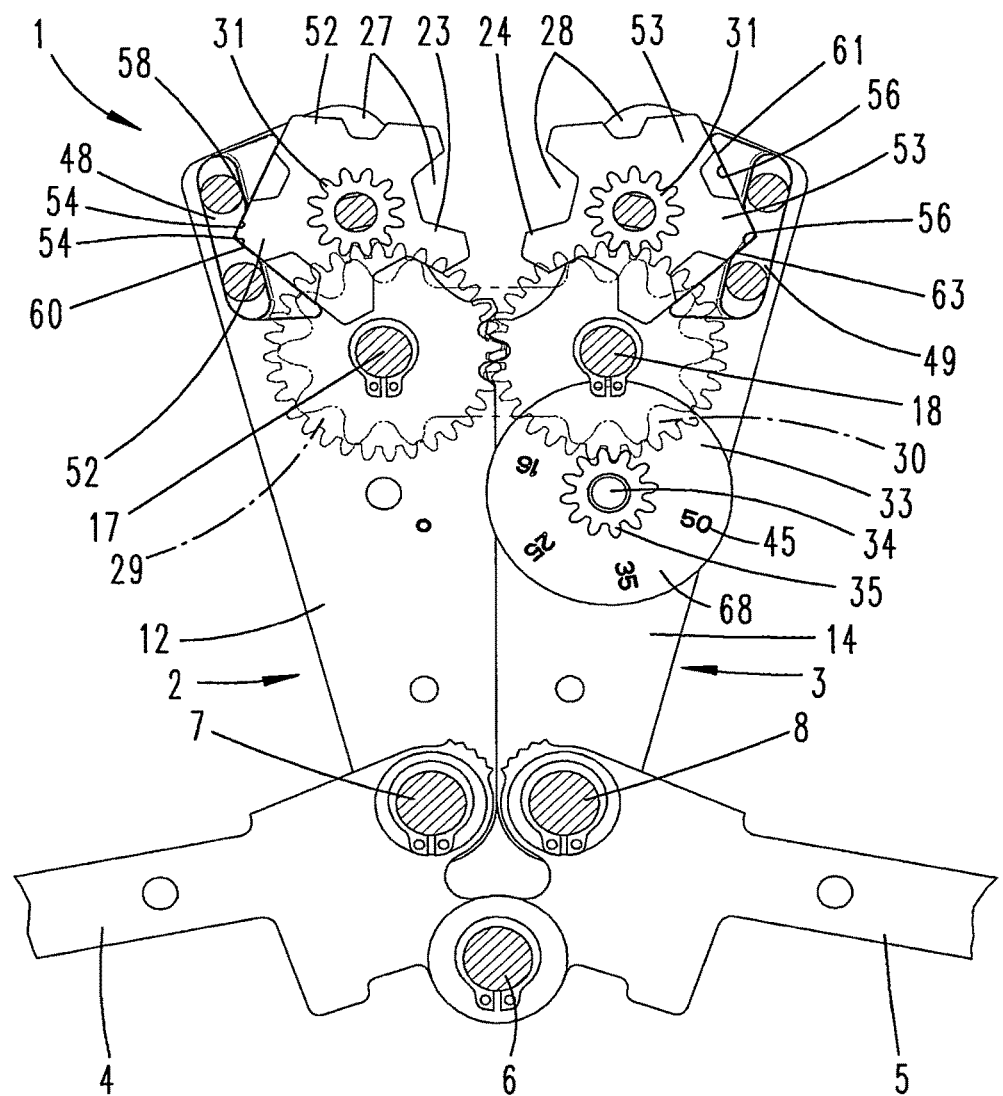
Figure 17:
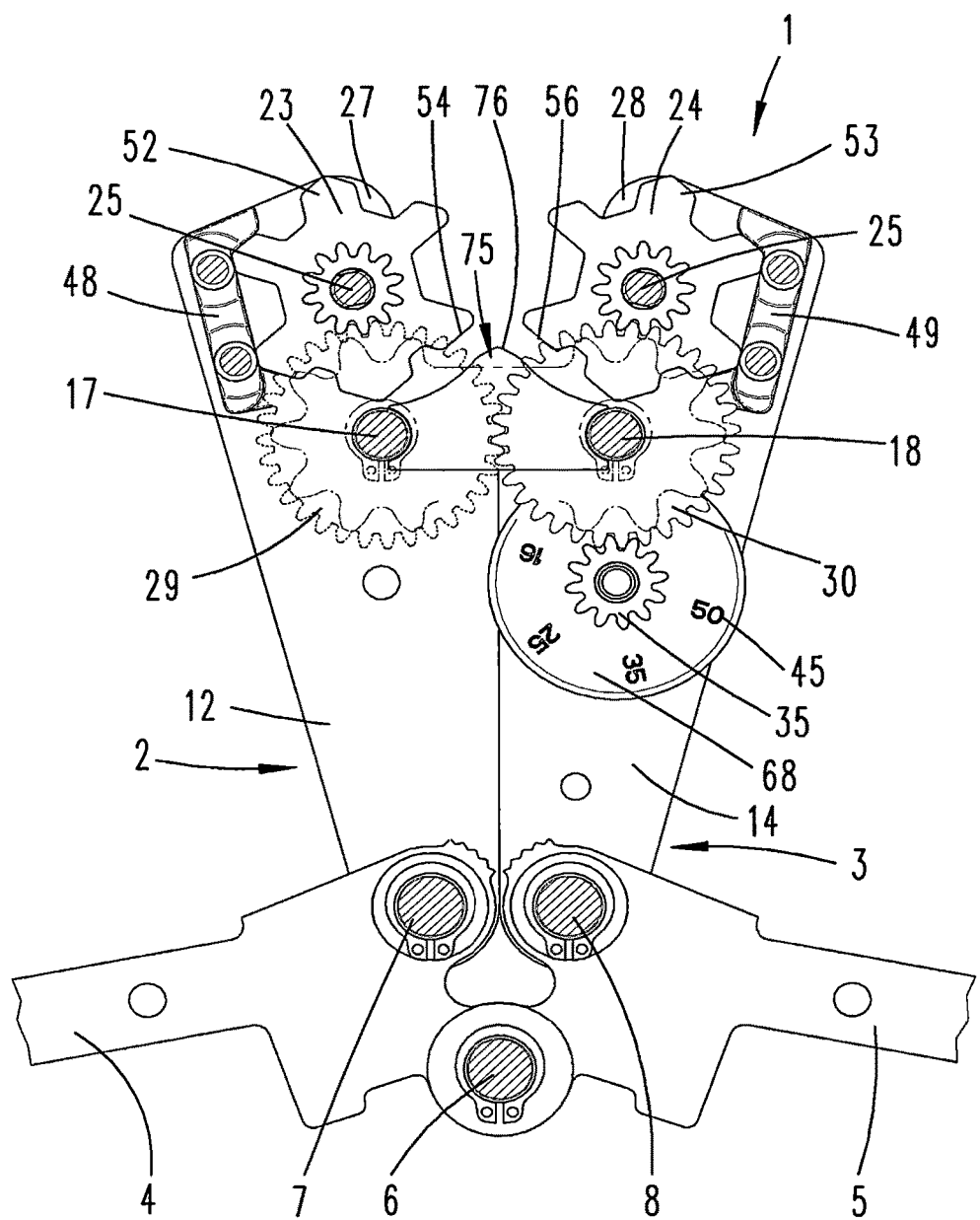
Figure 18:
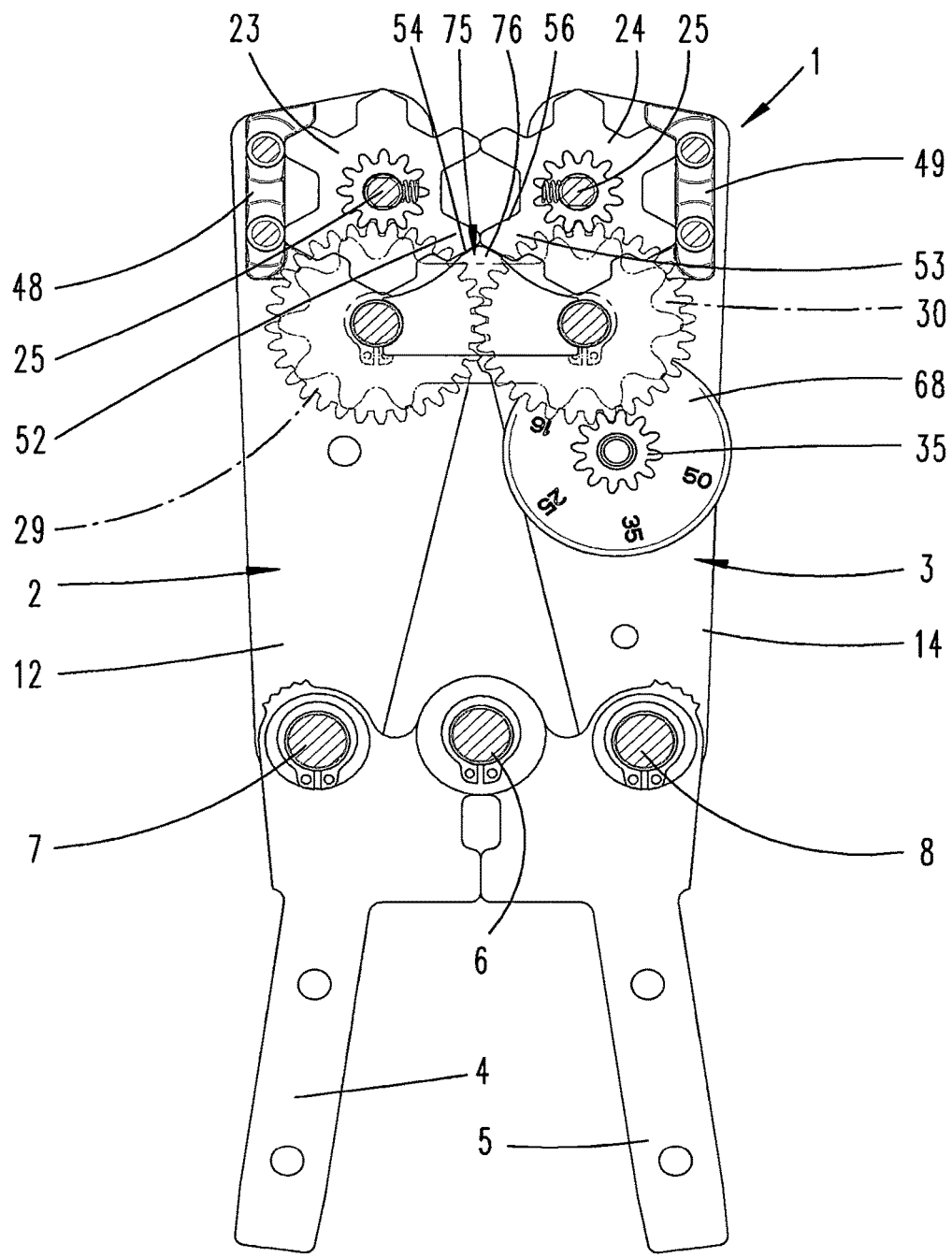
Figure 19:
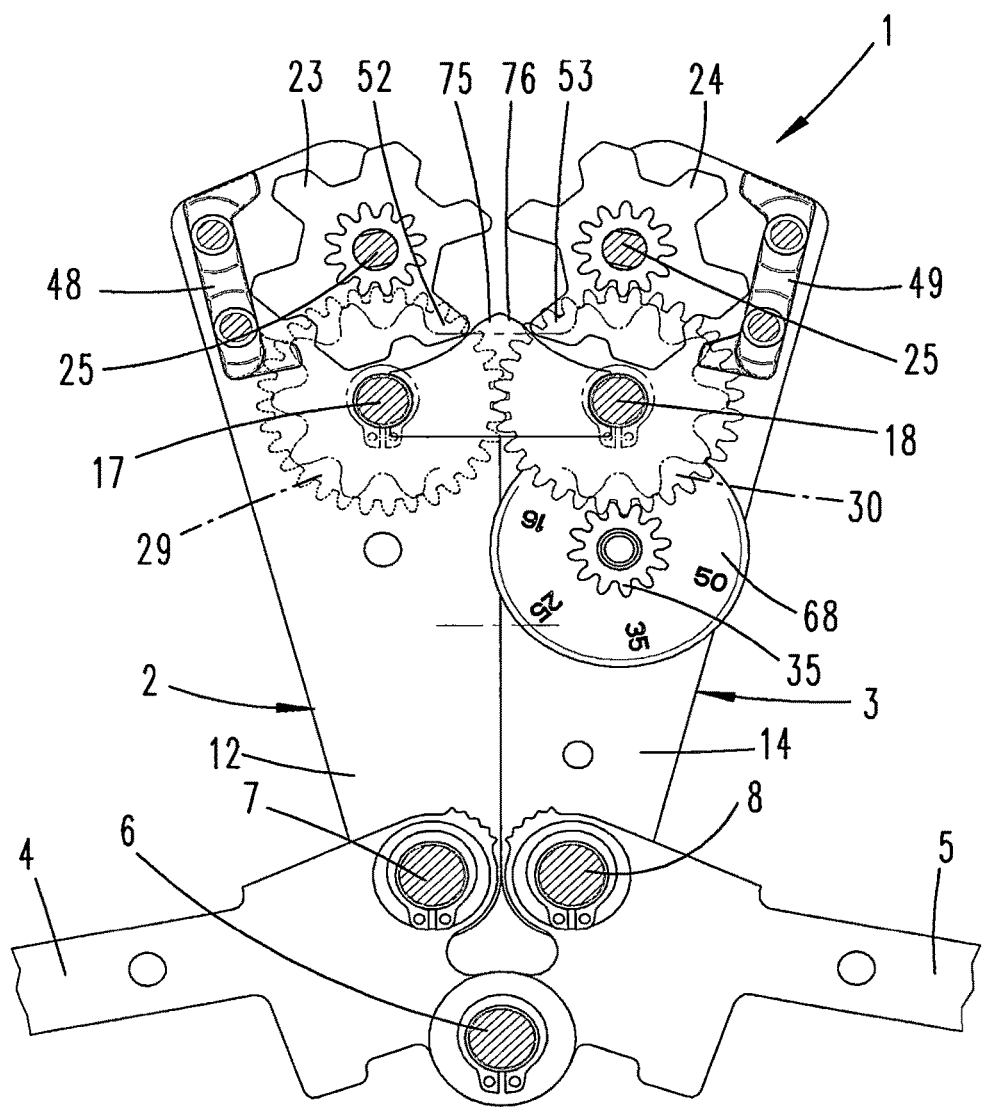
Figure 20:
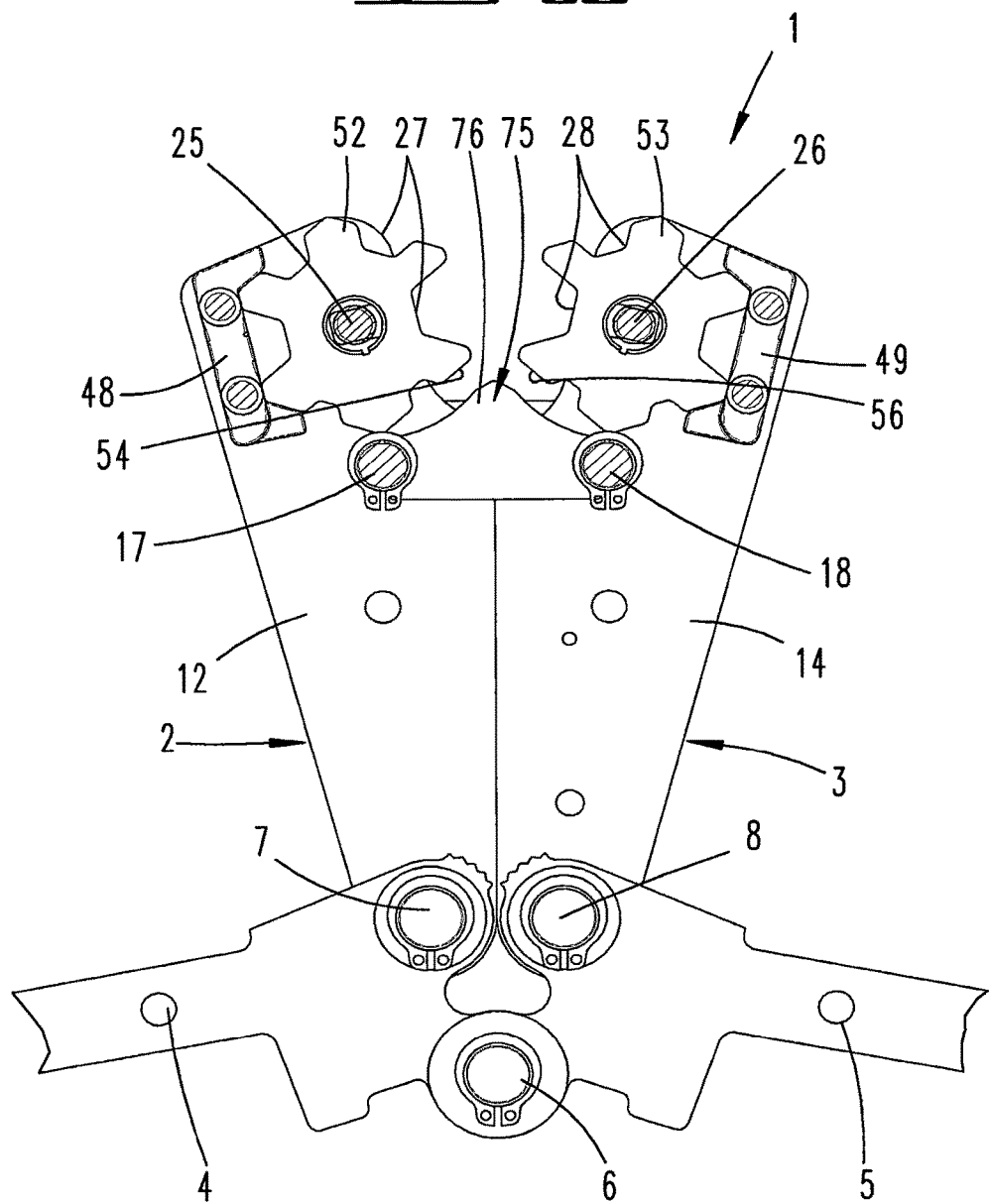
Figure 21:
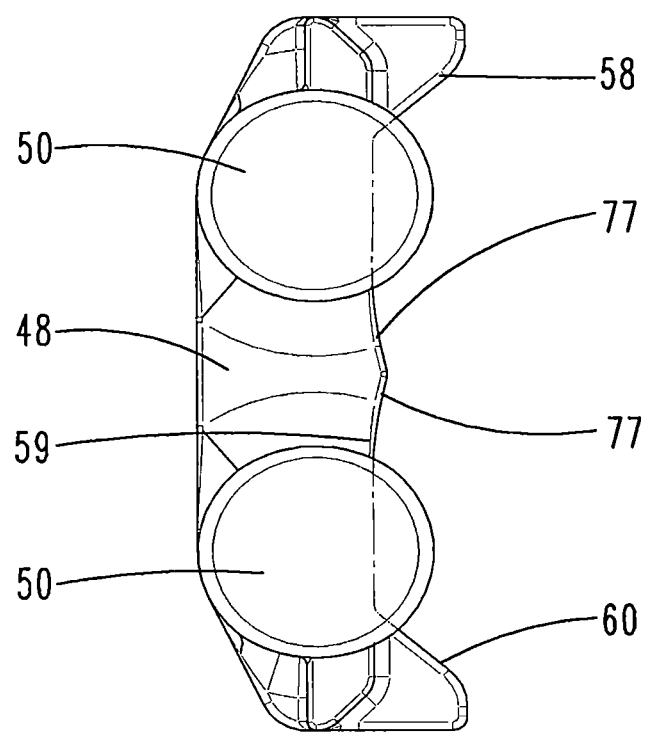
Figure 22:
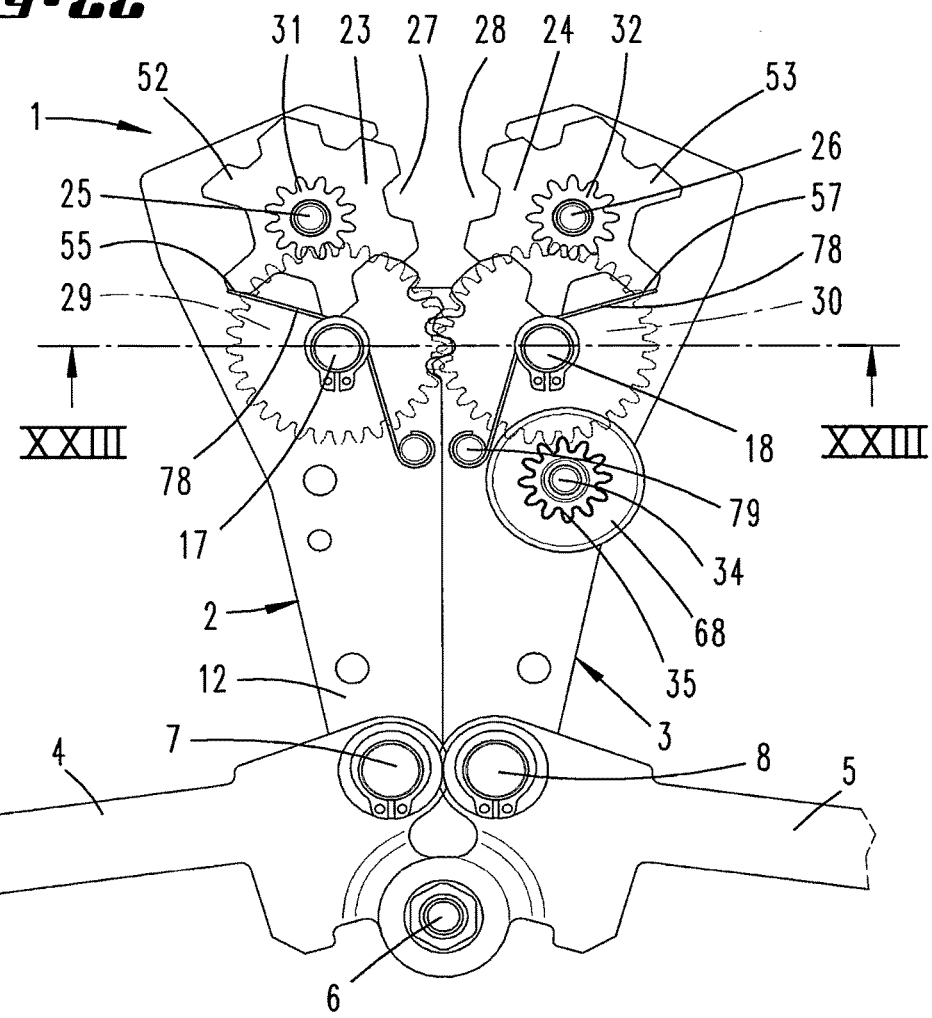
Figure 23:
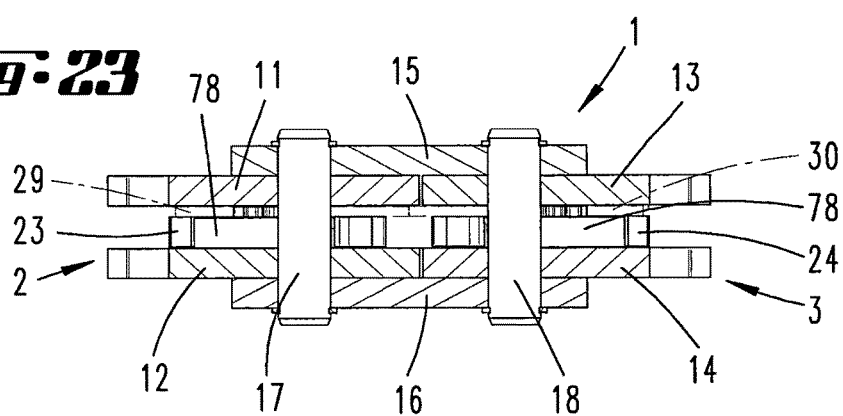
Figure 24:
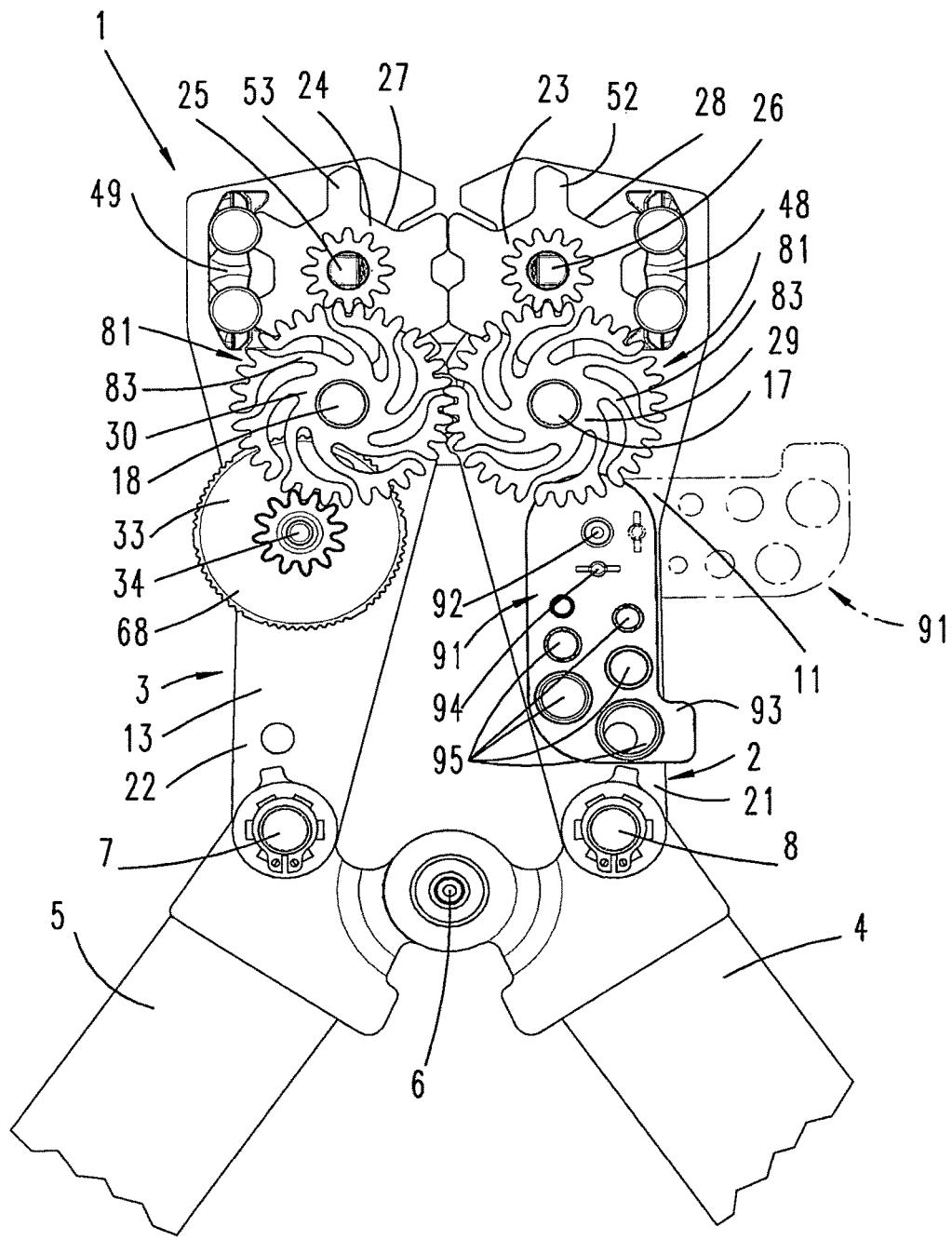
Figure 25:
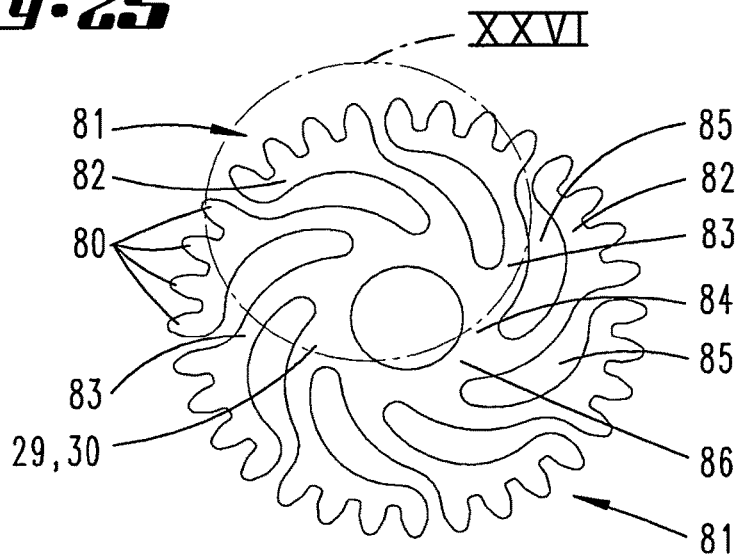
Figure 26:
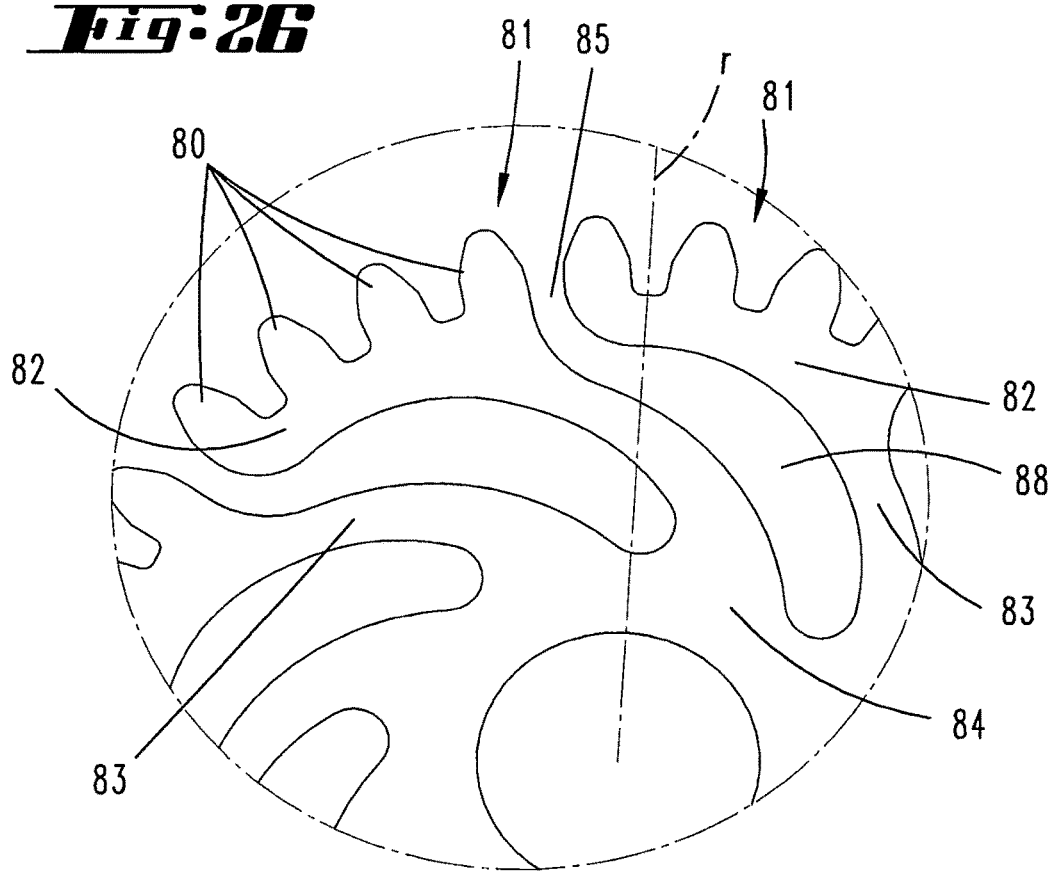
Figure 27:
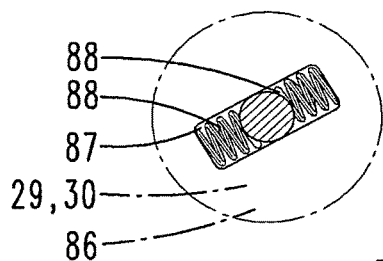
Figure 28:
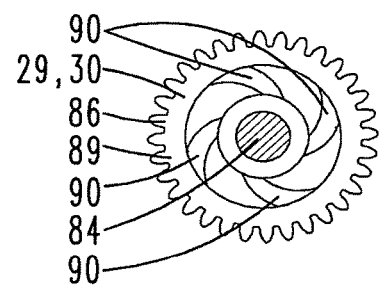
Figure 29:
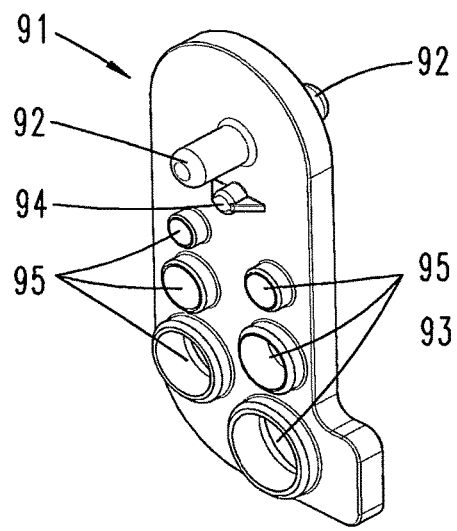
Figure 30:
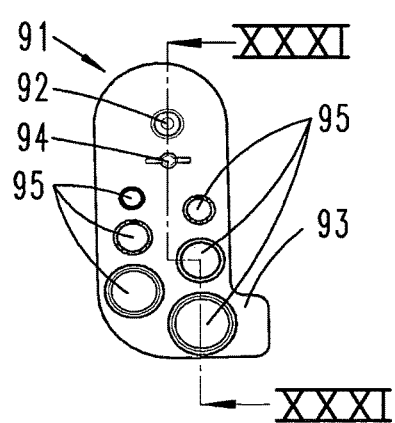
Figure 31:
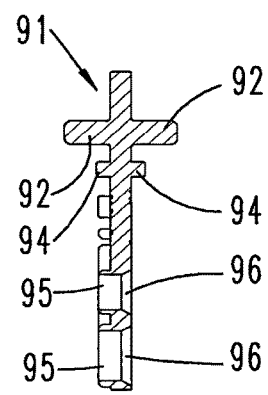

The invention is explained hereinafter with reference to the appended drawings which however merely show exemplary embodiments. A part which is only explained in relation to one of the exemplary embodiments and is not replaced by another part in a further exemplary embodiment as a result of the particular feature emphasized there is thus described as a possible part also provided for this further exemplary embodiment. In the drawings:

FIG. 1: shows a view of a manually operated crimping pliers in a first embodiment relating to a crimping jaw closed position;

FIG. 2: shows the side view hereto;

FIG. 3: shows the section along the line III-III in FIG. 2;

FIG. 4: shows the enlargement of the region IV in FIG. 3;

FIG. 5: shows a view corresponding to FIG. 3 but corresponding to the open position of the crimping jaws;

FIG. 6: shows a view corresponding to FIG. 5 with intermeshing toothed wheels shown by dashed lines;

FIG. 7: shows a view corresponding to FIG. 6 relating to an intermediate position in the course of the adjustment of the crimping matrices;

FIG. 8: shows a view of crimping pliers in a second embodiment;

FIG. 9: shows a view substantially corresponding to FIG. 3 relating to a third embodiment;

FIG. 10: shows a view substantially corresponding to FIG. 3 relating to a fourth embodiment of the crimping pliers as motor-drivable crimping pliers;

FIG. 11: shows a view substantially corresponding to FIG. 3 relating to a further embodiment;

FIG. 12: shows an exploded perspective view of an embodiment of a crimping matrix with coaxially assigned separate part, FIG. 13: shows a view corresponding to FIG. 5 relating to a further embodiment of crimping pliers;

FIG. 14: shows a further embodiment in a view according to FIG. 13;

FIG. 15: shows the crimping pliers according to FIG. 14 in crimping position;

FIG. 16: shows a view corresponding to FIG. 5 but relating to an alternative embodiment with regard to the crimping matrices;

FIG. 17: shows a further embodiment of crimping pliers according to the view in FIG. 5;

FIG. 18: shows the crimping pliers according to FIG. 17 in crimping position;

FIG. 19: shows a view substantially corresponding to FIG. 17 relating to an incorrect position of the crimping matrices;

FIG. 20: shows a view corresponding to FIG. 17 relating to an alternative embodiment;

FIG. 21: show an interlocking means in plan view, relating to a further exemplary embodiment;

FIG. 22: shows a view substantially corresponding to FIG. 6, relating to a further alternative embodiment;

FIG. 23: shows the section along the line XXIII-XXIII in FIG. 22;

FIG. 24: shows another plan view substantially corresponding to FIG. 3 of crimping pliers relating to a further embodiment;

FIG. 25: shows a gear wheel of the crimping pliers according to FIG. 23 in single plan view;

FIG. 26: shows an enlargement of the region XXV in FIG. 24;

FIG. 27: shows in schematic view a gear wheel in arrangement position relating to a further embodiment;

FIG. 28: show a view corresponding to FIG. 26 relating to a further embodiment;

FIG. 29: shows a gauge-like determination part in perspective view;

FIG. 30: shows a plan view of the determination part;

FIG. 31: shows the section along the line XXX-XXX in FIG. 29.

Shown and described initially with reference to FIG. 1 are hand-operated crimping pliers 1 in a plan view showing a working position, i.e., crimping position. The crimping pliers 1 have a substantially symmetrical structure with respect to an axis x-x and comprise two crimping jaws 2, 3 and two handles 4, 5 configured as angle levers. The latter are connected to one another at their bent ends by a hinge pin 6 arranged on the axis of symmetry x-x.

On both sides of the hinge pin 6 crimping jaws 2, 3 are articulated to the handles 4, 5 with their free end regions, wherein bolts 7, 8 passing through the crimping jaws 2, 3 and the handles 4, 5 are provided which are secured with spring rings 9, 10.

The crimping jaws 2, 3 which are configured to be substantially the same as a mirror image in relation to the axis x-x initially consists of two jaw plates 11, 12 and 13, 14 spaced apart from one another in the axial direction of the bolts 7, 8 and the hinge pin 6. The bolt-side end regions of the handles 4, 5 engage in the space between the jaw plates 11, 12 or 13, 14.

The crimping jaws 2, 3 are connected both in the upper side and on the underside corresponding in each case to the outwardly pointing flat side of the jaw plates, by lugs 15, 16 which in turn are connected to one another by axial bolts 17, 18 passing through the crimping jaws 2, 3.

The geometrical axes of the bolts 7, 8, the hinge pin 6 and the axial bolts 17, 18 are aligned transverse to the axis x-x and perpendicular to a plane extension of the crimping jaws 2, 3 in relation to their broad sides.

The axes of rotation of the crimping jaws 2, 3 are formed by the axial bolts 17, 18 whereby the crimping jaws 2, 3 are divided into short front lever arms 19, 20 and longer rear lever arms 21, 22 facing the hinge bolts 7, 8.

In the front short lever arms 19, 20 of the crimping jaws 2, 3, respectively one crimping matrix 23, 24 is mounted rotatably on an axis 25, 26. The axes 25, 26 pass through each of the jaw plates of the crimping jaws 2, 3 and are secured on both sides for example by means of screwing. The geometrical axis of rotation of the crimping matrices is designated by y.

The crimping matrices 23, 24 have the basic outline of an even-numbered polygon. In the exemplary embodiment shown the crimping matrices 23, 24 are configured in basic outline as regular hexagons.

The crimping matrices 23, 24 which are generally configured as disk-shaped have crimping dies 27, 28 with different opening cross-sections on the circumference, in each case assigned to a side surface of the preferred hexagon.

In a plan view for example according to FIG. 3 the crimping dies 27, 28 have the form of a half equilateral hexagon. In the working position, i.e. in the crimping position according to FIGS. 1 to 4, two crimping dies 27, 28 with the same opening cross-section together form a regular hexagon for pressing cable lugs, connectors or the like onto electrical conductors etc.

For the correct pressing of a cable lug or the like, crimping dies 27, 28 of the same size adapted to the pressing are to be brought into the working position. This is accomplished by turning the crimping matrices 23, 24 about the axes 25, 26.

The rotational displacement of the crimping matrices 23, 24 is synchronized. This is achieved by a permanent coupling of the crimping matrices 23, 24 via gearing which coupling is independent of the pivoting position of the crimping jaws 2, 3.

For the coupling via gearing in a first embodiment according to FIGS. 1 to 7, a gear wheel 29, 30 in the form of a toothed wheel is arranged rotatably on each crimping jaw 2. The diameters of the gear wheels 29, 30 are the same.

Like the crimping matrices 23, 24, the gear wheels 29, 30 extend in the space left between the jaw plates of the crimping jaws 2, 3.

The gear wheels 29, 30 are mounted rotatably on the axial bolts 17, 18, wherein the toothed-wheel-shaped gear wheels 29, 30 intermesh. As a result of the selected arrangement of the gear wheels 29, 30 on the axial bolts 17, 18, intermeshing is ensured in each pivot position of the crimping jaws 2, 3.

The outside diameter of each gear wheel 29, 30 substantially approximately corresponds to the diameter of a circular line connecting the radial tips of the crimping matrices 23, 24.

Driven wheels 31, 32 are provided on the axes 25, 26 which are connected to the respective crimping matrix 23, 24 in a torque-proof manner. The driven wheels 31, 32 are toothed wheels with reference to the first embodiment which mesh with the respective assigned gear wheel 29, 39.

The diameter of the driven wheel 31, 32 is reduced compared with the diameter of the gear wheel 29, 30. Thus, a driven wheel 31 has an outside diameter which corresponds to about 0.4 to 0.5 times the outside diameter of a gear wheel 29, 30.

Furthermore, the diameter of a driven wheel 31, 32 is selected so that with reference to a projection along the axis of rotation y, this does not project into the crimping dies 27 or 28 of the associated crimping matrix 23, 24.

Furthermore, a separate part 33 in the form of an adjusting wheel 68 is provided on a crimping jaw 3. This is mounted rotatably about an axial bolt 34 passing through the relevant jaw plates 13, 14 with an axis of rotation z in the region of the rear longer lever arm 22. The separate part 33 is circular-disk-shaped with a circular disk surface which extends in a plane offset manner parallel to the broad surfaces of the gear wheels 29, 30 and the crimping matrices 23, 24.

Assigned to a disk surface of the separate part 33, a drive wheel 35 in the form of a toothed wheel is provided on this in a torque-proof manner and arranged coaxially to this. This meshes with the external toothing of the associated gear wheel 30 of the crimping jaw 3.

The arrangement of the axial bolt 34 is here preferably selected so that the separate part 33 projects freely outwards with a partial section beyond the basic outline contour of the crimping jaw 3, i.e. facing away from the opposite crimping jaw 2, for operation of the drive wheel 35 by hand. Thus, for example the drive wheel 35 can be operated with the thumb whereby the thumb surface rotationally displaces the separate part 33 over its circumferential edge.

A rotational displacement of the separate part 33 via the gearing consisting of drive wheel 35, gear wheels 29, 30 and driven wheels 31, 32 results in a synchronous rotational displacement of the crimping matrices 23, 24 so that merely by displacement of only one part (separate part 33), the same crimping dies 27, 28 can always be brought into the working position opposite one another.

Alternatively to a toothed wheel gearing arrangement, the coupling via gearing according to the embodiment in FIG. 11 can also be achieved by transmission belts.

The circular-disk-shaped separate part 33 as well as the crimping matrices 23, 24 in this case have cylinder sections 36 to 38 arranged in a torque-proof manner and coaxially to these, whose lateral outer surfaces can be roughened for example by a microstructuring.

These cylinder sections 39, 40 are also mounted freely rotatably on the axial bolts 17, 18.

Each axial-bolt-side cylinder section 39, 40 is connected via a driven belt 41, 42 to the cylinder section 36, 37 of the associated crimping matrix 23, 24.

A drive belt 43 optionally laid crossed connects the axial-bolt-side cylinder section 40 to the cylinder section 38 of the separate part 33.

The two axial-bolt-side cylinder sections 39 and 40 are connected to one another via a transmission belt 44 which is preferably arranged crossed.

On the separate part 33, symbols 45 in the form of numbers are applied to the circular disk surface thereof, which numbers correspond to the nominal widths of the crimping dies 27 and 28. The symbols 45 are arranged on a circular line about the geometrical axis of the axial bolt 34 in such a manner that the nominal width relating to the crimping dies 27, 28 in the working position can be identified for the user either on the section of the separate part 33 projecting beyond the basic outline of the crimping jaw 3 (cf. FIG. 1 or FIG. 5) or through a window 46 punched freely in the jaw plate 13 of the crimping jaw 3 covering the number side of the separate part 33 (cf. for example FIG. 8).

Also as shown as an example in FIG. 12, a separate part 47 can be provided with applied symbols 45, for example printed on or formed integrally with the separate part, which part 47 is arranged coaxially to a crimping matrix 23, 24 and is further formed for example contour-adapted with the crimping matrix 23, 24.

The part 47 is connected in a torque-proof manner to the crimping matrix 23, 24, for example by means of a non-round configuration of the bore through which the axis 25, 26 passes and the section of the axis which passes through.

Independently of the configuration and arrangement of the separate part carrying the symbols 45, this is not exposed to any crimping force during a pressing. Preferably compared with the crimping matrices 23, 24 a different material is selected for the separate part, for example zinc die casting which facilitates the application of numbers 45 for example by imprinting or embedding the symbols 45 in the course of the casting process.

The respective working position of the crimping matrices 23, 24 is protected by interlocking. To this end each crimping matrix 23, 24 is assigned a bracket-like interlocking means 48, 49. The interlocking means 48, 49 extend in the intermediate space between the associated jaw plates of the crimping jaws 2, 3 and are held in the jaw plates by pin-like continuations 50, 51.

The interlocking means 48, 49 are arranged facing away from the crimping die 27, 28 located in the working position.

When viewed in the circumferential direction of each crimping matrix 23, 24, a tooth-like projection 52, 53 aligned substantially radially in relation to the geometrical axis of rotation y of the crimping matrix 23, 24 extends between two adjacent crimping dies 27, 28.

Each projection 52, 53 has two application surfaces 54, 55 or 56, 57 enclosing an obtuse angle with respect to one another in the basic outline. The application surfaces yield a roof-shaped taper of each projection 52, 53.

The application surfaces 54, 55 or 56, 57 extend further in relation to a basic outline according to FIG. 3 on a line of a hexagonal contour connecting the tips of the projections 52, 53.

The application surfaces 54, 55 or 56, 57 of the projections 52, 53 which delimit the crimping die opposite the crimping dies 27, 28 in the working position cooperate with adapted interlocking surfaces 58 to 60 or 61 to 63 of the interlocking means 48, 49.

Preferably the application surfaces of the projections 52, abut over the entire surface against the associated interlocking surfaces of the interlocking means 48, 49 in the interlocking position.

With reference to a straight line A connecting the geometrical axes of the axial bolts 17, 18, the interlocking surfaces 59, 62 in the pressing position of the crimping jaws 2, 3 according to the diagram in FIG. 4 extend in the transverse direction to the straight line A. The application surfaces 55, 57 of the crimping matrices 23, 24 directly adjoining the crimping die 27, 28 facing the interlocking means 48, 49 in the circumferential direction are supported in the interlocking position on this interlocking surface 59, 62 aligned transversely to the straight line A.

In the interlocking position the further application surfaces 54, 56 extend at an acute angle α of about 30 degrees to the straight line A (with reference to the pressing position according to FIG. 4).

The corresponding interlocking surfaces 58, 60 and 61, 63 run from the interlocking surfaces 59, 62 at a corresponding acute angle for preferably full-surface abutment of the corresponding application surfaces.

According to the diagram in FIG. 3, the crimping matrices 23, 24 are rotationally secured in the interlocking position. The interlocking must first be unlocked for twisting of the crimping matrices 23, 24. This is accompanied by the rotational action on the crimping matrix 23, 24, in particular by the gear-translated action by hand via the separate part 33.

The axes 25, 26 of the crimping matrices 23, 24 are guided in elongated holes 64, 65 of the crimping jaws 2, 3 aligned transversely to the alignment of the interlocking surfaces 59, 62 with reference to a basic outline. By this means the crimping matrices 23, 24 are displaced transversely to the interlocking means 48, 49 to unlock the interlocking protection.

Such a displacement takes place against the force of a spring 66. This can be a cylindrical compression spring as shown for example in FIG. 1 which is supported, sitting in a radial bore of the axis 25, 26, against a boundary wall of the associated elongated hole 64, 65.

Also according to the diagram in FIG. 9, the spring can be a leg spring which is held in the region of the axial bolts 17, 18 and acts with its free ends on the axes 25, 26 of the crimping matrix 23, 24 in the direction of the interlocking means 48, 49.

The spring force always acts in the direction of the interlocking position, this independently of the pivot position of the crimping jaws 2, 3.

In order to adjust the crimping matrices 23, 24, the disk-shaped separate part 33 according to the diagram in FIG. 6 is preferably turned in the direction of arrow a—with reference to the diagram in the clockwise direction. This results in an opposite rotation of the two gear wheels 29, 30 in the arrow directions b, c.

Via the gear wheels 29, 30, the driven wheels 31, 32 and accordingly the crimping matrices 23, 24 are rotationally displaced again in the opposite direction d, e which results in a forcibly guided transverse displacement of the crimping matrices 23, 24 whilst the application surfaces 54 and 56 slide on the associated interlocking surfaces 60, 63. This transverse displacement is superposed on the rotational displacement of the crimping matrix 23, 24.

If the following projection 52, 53 in the direction of rotation exceeds a dead point position (shown in FIG. 7) whilst sliding on the interlocking surface 59, 62, the spring force acting on the axes 25, 26 of the crimping matrices 23, 24 brings about a back-displacement of the crimping matrices 23, 24 in the direction of the interlocking position with the interlocking means 48, 49.

As shown in the exemplary embodiment of FIG. 21, the relevant interlocking surface 59 or 62 can be provided with two sliding surfaces 77 aligned in a roof-like manner to one another. The interlocking surface 59, 62 is thus preferably tapered at the height of a line connecting the matrix axes of rotation in the direction of the matrix 23, 24. The sliding surfaces 77 are adapted to a curve section with reference to a plan view so that starting from one end an interlocking surface 59, 62 initially yields an ascending and then a descending surface.

On exceeding or reaching the dead point position, due to the spring force acting on it, the crimping matrix 23, 24 thereby experiences an angular momentum in the direction of the next interlocking position or before reaching the dead point position (when the rotational force acting on the matrix is absent), a back angular momentum in the direction of the previous interlocking position. Any undesired resting of the crimping matrix 23, 24 in the dead point position and self-inhibition is thus counteracted.

The crimping die 27, 28 now located in the working position can be read off in relation to its nominal width on the separate part 33.

If the application surfaces 54, 56 and the appurtenant interlocking surfaces 58, 60 and 61, 63 have the same acute angle to the straight line A, a change of the crimping dies 27, 28 can be achieved by turning the separate part 33 in one or also in the other direction, in the arrow direction a or opposite direction.

Only one direction of rotation can be predefined since one of the previously described angles of the application surfaces and interlocking surfaces has a comparatively small acute angle and thus form a stop which cannot be run over.

Also an adjustment of the crimping matrices 23, 24 with the crimping jaws 2, 3 open can be made by directly grasping on of the crimping matrices 23 or 24 (this possibly whilst omitting the disk-shaped separate part 33). The movement of the one crimping matrix 23 results in the synchronous movement of the other crimping matrix via the gearing provided.

FIG. 10 shows electrically operated crimpling pliers 1 in which the crimping jaws 2, 3 are moved into the pressing position and back by means of a tappet which can be operated by electric motor. The pressing process is triggered via a finger-actuated lever 67.

The crimping pliers according to the diagram in FIG. 10 have a previously described gearing for coupling the crimping matrices 23, 24 as well as a disk-shaped separate part 33 for adjusting the crimping matrices by hand. Numbers 45 are applied to the separate part 33 or let into the part to give the set nominal width of the crimping dies 27, 28.

The mode of action relating to the adjustment of the crimping matrices 23, 24 is the same as that of the manually operated crimping pliers 1.

FIG. 13 shows another embodiment of crimping pliers 1 in which an adjusting wheel 68, 69 is arranged on each crimping jaw 2, 3. Here also the axis of rotation z of each adjusting wheel 68, 69 is arranged parallel and offset in the longitudinal direction of extension of the crimping jaw 2, 3 with respect to the axis of rotation y of the associated crimping matrix 23, 24.

The adjusting wheels 68, 69 are coupled to the associated crimping matrix 23, 24 via gear wheels 29, 30.

The gear wheels 29, 30 in this embodiment are arranged so that their sprockets do not intermesh in any swivel position of the crimping jaws 2, 3.

In this embodiment an adapted crimping jaw is adjusted by individual adjustment of the two crimping matrices 23, 24 via the respective adjusting wheel 68, 69.

The crimping matrices 23, 24 are also adjusted here by acting in a region spaced apart from the crimping matrices 23, 24, in particular as a result of a rotational displacement of the associated adjusting wheel 68, 69.

Here also it is advantageously possible to place the crimping jaw numbers 45 on the adjusting wheels 68, 69.

FIGS. 14 and 15 show an embodiment with a synchronous adjustment of the crimping matrices 23, 24 for example according to the first embodiment.

One of the crimping jaws, here the crimping jaw 2, carries a rotationally mounted stop pawl 70 parallel to the swivel axis of the crimping jaw 2. This is loaded into a base position according to FIG. 14 by means of a tension spring 71 also held on the crimping jaw 2 at the other end.

The stop pawl 70 has a pawl lug 72. In the basic alignment according to FIG. 14, this points in the direction of the articulation point of the handle 4 on the crimping jaw through which the bolt 7 passes.

A radial side arm is also formed on the stop pawl 70. This lug 73 pointing laterally in the direction of the other crimping jaw 3 also serves as emergency trigger.

In the area of the articulation point of the handle 4 through which the bolt 7 passes, a toothed wheel segment 74 is formed coaxially to the bolt 7 or its bolt axis for cooperation with the pawl lug 72.

The stop pawl 70 lies between the jaw plates 11, 12 of the crimping jaw 2 and in an open position of the crimping pliers 1 according to FIG. 14 engages in a non-toothed region of the articulation point.

On swiveling the handles 4 and 5 for the pressing closure of the crimping pliers 1, the pawl lug 72 engages in a locking manner in the toothed wheel segment so that from this position, only a further displacement of the handle 4 in the direction of the other handle 5 can be performed.

Such a forced locking ensures that when making a crimping connection, the entire crimping pressure must always be exerted.

On reaching the crimping position, the pawl lug 72 has overrun the toothed wheel segment 74 and after this again lies in its stretched initial position (cf. FIG. 15) so that an opening of the handles 4, 5 or an opening of the crimping pliers 1 is possible with ratchet-like overrun.

In an emergency, the stop pawl 70 can be displaced by the user via the lug 73 into a non-engaging position so that it is possible to open the crimping pliers 1 without completing a pressing.

FIG. 16 shows an alternative embodiment with crimping matrices 23, 24 which each draw a regular pentagon in relation to their outer contour with reference to the basic outline.

Accordingly five crimping dies 27, 28 are provided over the circumference, assigned centrally to the longitudinal edges. In the longitudinal direction the projections 52, 53 extend between these.

The projection 52, 53 diametrically opposite the crimping die 27, 28 in the working position is used to cooperate with the interlocking means 48, 49 of the connector position assurance of the crimping matrices 23, 24 in the working position.

Here the projection 52, 53 dips with its tip region having the application surfaces 54 and 56 into a notch-like recess of the interlocking means 48, 49 which notch-like recess is formed by the relevant interlocking surfaces 58, 60 or 61, 63.

The interlocking surfaces 58, 60 or 61, 63 extend with reference to the basic outline according to FIG. 16 beyond the crimping die 27, 28 adjacent to the captured projection 52, 53. Further preferably the application surfaces of the leading or trailing projection 52, 53 in the direction of rotation of the crimping matrix 23, 24 are also supported.

In the embodiment according to FIGS. 17 to 19, based on crimping pliers according to the diagrams in FIGS. 1 to 6, a gauge part 75 is provided. This is preferably a plate part with a substantially triangular basic outline according to the diagram in FIG. 17.

The gauge part 75 preferably extends between the jaw plates so accordingly preferably in the plane of the crimping matrices 23 and 24. The gauge part 75 can have a thickness viewed in the axial direction of the crimping matrices 23 and 24 which corresponds to that of the crimping matrices 23, 24.

Furthermore, in the embodiment shown the gauge part 75 is penetrated by the axial bolts 17 and 18 in the region of two triangle apexes and is thus held.

A triangular tip 76 of the gauge part 75 is thus obtained which tip projects into the jaws of the crimping pliers 1 into which jaw the crimping dies 27, 28 in the working position also project at the same time when the crimping matrices 23 and 24 are correctly aligned.

The flanks of the tips 76 are adapted to the outer contour of the projections 52 and 53, in particular adapted to the application surfaces 55 and 57.

The application surfaces 55, 57 of two projections 52, 53 coming into the working position with respect to one another enclose an obtuse angle of about 120 degrees for example in the crimping position according to FIG. 18 which corresponds to the enclosed angle of the pointed flanks of the gauge part 75.

When the crimping matrices 23 and 24 are correctly aligned and latch-secured according to the diagram in FIG. 17, it is possible to close the crimping jaws 2 and 3. The application surfaces 55, 57 to be pointing substantially towards one another of the projections 52 and 53 abutting against one another in the crimping position are optionally supported on the pointed flanks of the gauge part 75.

If on the other hand the crimping matrices 23 and 24 are not completely displaced in their final and preferably latch-secured position (cf. FIG. 19), in the course of the pliers closing movement at least one of the projections 52, 53 impinges against the facing flank of the gauge part tip 76. This can result in prevention of the pliers closing movement, consequently locking.

The flanks of the gauge part 75 adjoining the tip region are preferably concavely shaped when viewed from the gauge part outwards. This offers a controlled guidance of the projection 53, 53 which occurs when the crimping matrix is not correctly set in the course of the pliers closing movement, preferably in the direction of the usual direction of rotational displacement of the crimping matrices 23, 24 before reaching the working position.

FIG. 20 shows an embodiment with a gauge part 75 of the previously described type in which crimping pliers 1 the crimping matrices 23 and 24 can be adjusted individually and directly by hand.

FIGS. 22 and 23 show another embodiment of crimping pliers 1 with crimping matrices 23 and 24 which can be adjusted synchronously via gear wheels 29 and 30 and preferably an adjusting wheel 68.

In this embodiment the crimping matrices 23 and 24 are rotationally mounted about fixed axes 25 and 26 which are accordingly preferably not displaceable transversely to the axis y.

A crimping position of the crimping matrices 23, 24 in particular found via the adjusting wheel 68 and the gear wheels 29, 30 is also secured in this embodiment. For this purpose each crimping matrix 23, 24 is assigned a spring 78 in the form of a leaf spring. The spring 78 is fixed in the region of one end on a retaining pin 79 which retaining pin 79 is held on the associated crimping jaw 2, 3, in particular between the appurtenant jaw plates. The spring 78 extends from the retaining pin 79 in the direction of the appurtenant crimping matrix 23, 24, thereby partially surrounding the axial bolts 17, 18 under resilient bending of the associated gear wheel 29, 30, whereby a corresponding support of the spring 78 with one of its broad sides on the axial bolt is achieved.

The end of the spring 78 facing away from the retaining end extends after the support region on the axial bolt 17, 18 in a direction facing away from the crimping die 27, 28 in the crimping position.

The spring 78 is supported with its free region spanned via the axial bolts 17, 18 on the facing application surfaces 55 or 57 of two successive projections 52, 53 in the direction of twisting of the crimping matrix 23, 24. As a result of the spring force acting on the projections 52, 53, a positive interaction is achieved to secure the crimping matrix 23, 24 in the found crimping position. A twisting of the crimping matrix 23, 24 necessarily takes place against the force of the spring 78 acting in the anticlockwise direction (in relation to the diagram in FIG. 22). The free spring leg is further deflected with the turning of the crimping matrix 23, 24.

The width of the leaf spring observed in the direction of the axis of rotation y of the crimping matrix 23, 24 preferably corresponds to the height of the application surfaces cooperating with the spring 78 observed in the same direction and therefore further preferably of the material thickness of the crimping matrix 23, 24 observed further in the axial direction in the region of the projections 52, 53.

FIG. 24 shows another embodiment of the crimping pliers 1. In this embodiment the crimping matrices 23, 24 are also adjustable jointly and synchronously via gear wheels 29, 30 for which an adjusting wheel 68 acting on the gear wheel is further provided.

The gear wheels 29, 30 have the same configuration.

The gear wheels 29, 30 are also configured to be elastically resilient. For this purpose the teeth 80 of each gear wheel 29, 30 are divided into groups 81 of four successive teeth 80 in the circumferential direction.

The teeth 80 of one group are formed on a retaining part 82. From this a spring-mounted branch 83 continues in the same material and in one piece, which is connected to a radially inner region 84 of the gear wheel 29, 30 which is also in the same material and in one piece.

The gear wheel 29, 30 or toothed wheel 86 has eight groups of four teeth 80 each distributed uniformly over the circumference which eight groups 81 are connected to the inner region 84 via one branch 83 each.

The branches 83 are connected off-centre to the retaining part 82 with reference to a radius r (relative to the geometrical axis of rotation of the gear wheels 29, 30 or the toothed wheel 86), which radius r passes through the retaining part 82 centrally in its circumferential extension. Preferably the connection of the branch 83 in the circumferential direction is formed at the end of the retaining part 82.

In each case one tooth 80 can form the end region of the retaining part 82. The radius r can run centrally through a tooth gap formed between the central teeth 80.

Starting from the connection to the retaining part 82, each branch 83 runs in the form of a curve section with reference to a plan view according to FIG. 24, starting from the retaining part 82 moving away from this in the circumferential direction and gripping radially inwards behind the adjacent group 81 or the retaining part 82 in the circumferential direction.

The connection of the branch 83 to the radially inner region 84 can be selected so that a radius passing centrally through this connecting region at least approximately intersects the branch connecting region on the retaining part 82 of the neighbouring group 81 in the circumferential direction.

As a result of the previously described configuration of the gear wheel 29, 30 or toothed wheel 86, a resilience of an engaged group 81 of teeth 80 is achieved, this even in the case of central, in particular strictly radial application, wherein a resilient effect can be achieved both in the radial and in the circumferential direction.

Alternatively a resilient effect can also be achieved by forming the toothed wheel 86 or the gear wheel 29, 30 from a compliant material, further for example by forming the same from a rubber material. A resilient displacement as shown as an example and schematically in FIG. 27 can also be provided. Thus, the axial bolts 17, 18 can be guided in an elongated hole of a jaw plate and be loaded by compression springs 88 into a central working position.

Further alternatively the toothed wheel 86, such as for example the gear wheel 29, 30, furthermore however also the adjusting wheel 68, 69 can be formed by a circumferential sprocket 89 which is connected to the inner region 84 via elastically resilient spring arms 90 running in the form of a circular section in plan view (cf. FIG. 28).

In order to be able to classify the conductor to be pressed with regard to the crimping die size, a gauge-like determination part 91 can be provided. This is plate-shaped, for example consisting of a hard plastic, alternatively of a metal material.

The determination part 91 can be arranged pivotably on the crimping pliers 1, in particular between the jaw plates 11, 12.

The determination part 91 can comprise pivot pins 92 formed in one piece, which sit in corresponding bores or recesses of the jaw plates 11, 12. The resulting geometrical axis of rotation runs parallel to the axes y of the crimping matrices 23, 24.

The determination part 91 can be folded out from a non-usage position in which this is arranged between the jaw plates 11, 12 arranged to overlap into a usage position shown by the dot-dash line in FIG. 24.

For gripping the determination part 91, a gripping section 93 which projects freely beyond the facing edges of the jaw plates 11, 12 even in the non-usage position is formed.

Furthermore, friction projections 94 can be provided on both broad side surfaces of the determination part 91 close to the pivot pins 92, which hold the determination part 91 in the non-usage position as a result of frictional engagement with the facing surfaces of the jaw plates 11, 12.

Furthermore the determination part 91 has a plurality of passage openings 95 which pass through the broad side surfaces of the determination part 91. Preferably the number of passage openings 95 is adapted to the number of crimping dies 27, 28 of the crimping matrices 23, 24.

Each passage opening 95 has a narrowest cross-section, in particular in the region of an annular collar-like extension in the region of a broad side surface of the determination part 91, which narrowest cross-section corresponds to a nominal diameter of an electrical conductor.

Assigned to the passage openings 95, information on the crimping dies 27, 28 can be provided on the determination part 91 on the broad side surface, which information corresponds to the setting information on the adjusting wheel or directly on the crimping matrices 23, 24. An unambiguous classification of the electrical conductor and thus of the cable lug or the like to be pressed, and also further of the crimping dies 27, 28 to be set is thus made possible.

In order to facilitate insertion of the electrical conductor into the passage opening 95, this has an insertion funnel-like section 96 at least on one side. This is preferably formed on the broad side of the determination part 91 opposite the annular collar.

The preceding explanations are used to explain the inventions covered overall by the application, which independently further develop the prior art at least by the following feature combinations, namely:

Crimping pliers characterized in that the crimping matrices 23, 24 are permanently coupled to each other via the gearing independently of a swivel position of the crimping jaws 2, 3;

Crimping pliers characterized in that a crimping matrix 23, 24 is movable by means of a gear wheel 29, 30 transversely to the axis of rotation (y);

Crimping pliers characterized in that a crimping matrix 23, 24 is movable by means of a gear wheel 29, 30 from a first crimping position protected by interlocking into a second crimping position protected by interlocking;

Crimping pliers characterized in that a crimping matrix 23, 24 can be adjusted to move another crimping die 27, 28 into a working position by means of a gear action against a force urging the crimping matrix 23, 24 into an interlocked working position accompanied by a movement transverse to its axis of rotation y;

Crimping pliers characterized in that the crimping matrix 23, 24 is movable transverse to its axis of rotation y to unlock the interlocked position;

Crimping pliers characterized in that a crimping die 27, 28 of the crimping matrix 23, 24 is formed by tooth-like projections 52, 53 which comprise an application surface 54 to 57 on an outer side of the crimping die 27, 28 which can be brought into engagement with an interlocking means 48, 49 in a working position of a crimping die 27, 28, wherein when viewed in the direction radial to an axis of rotation y, the application surface 54 to 57 brought into engagement with the interlocking surface encloses an acute angle α with respect to a straight line A running through the axes of rotation of the opposing crimping matrices 23, 24;

Crimping pliers characterized in that the interlocking surface 59, 62 forms an ascending and/or descending sliding surface 77 in a plan view, whereby the crimping matrix 23, 24 can be brought into a stop-limited rotation end position about its axis of rotation y;

Crimping pliers characterized in that the engaged application surface 54 to 57 of a crimping die 27, 28 pertains to an opposite crimping die 27, 28, located in the working position, in relation to the axis of rotation y of the crimping matrix 23, 24;

Crimping pliers characterized in that two opposite application surfaces 54 to 57 are provided in relation to the straight line A and/or preferably that the acute angles (α) of the two application surfaces 54 to 57 are the same;

Crimping pliers characterized in that a crimping matrix 23, 24 can be moved out of the interlocked position for adjustment only against spring force and/or preferably that the spring force and/or the acute angle α are selected so that an adjustment of a crimping matrix 23, 24 by hand is made possible and/or preferably that the spring force and/or the acute angle α are selected that only a gear adjustment is made possible;

Crimping pliers characterized in that symbols 45 are applied to a part 33, 47 which is separate from the crimping matrix 23, 24, which is not exposed to any crimping force during a pressing and consists of a different material from the material of the crimping matrix 23, 24;

Crimping pliers characterized in that the separate part 47 is firmly connected to the crimping matrix 23, 24 and/or preferably that the separate part 47 is arranged coaxially to the crimping matrix 23, 24;

Crimping pliers characterized in that the separate part 33 is arranged about a further axis of rotation and is connected to the crimping matrix 23, 24 by means of gears;

Crimping pliers characterized in that the symbols 45 are printed onto the separate part 33, 47 and/or preferably that the symbols 45 are formed integrally with the separate part 33, 47;

Crimping pliers characterized in that each crimping matrix 23, 24 is adjustable by means of an adjusting wheel 68, 69 coupled to this via the gearing, wherein the adjusting wheel 68, 69 and the crimping matrix 23, 24 have different axes of rotation y, z;

Crimping pliers characterized in that the axes of rotation y, z run parallel to one another;

Crimping pliers characterized in that a crimping jaw 2, 3) has a longitudinal direction from a hinge on the handle side to a free end, and that the axes of rotation y, z are offset with respect to one another in the longitudinal direction;

Crimping pliers characterized in that the adjusting wheel 68, 69 acts on the crimping matrix 23, 24 via a gear wheel 29, 30;

Crimping pliers characterized in that the crimping matrix 23, 24 is rotatable about a fixed axis 25, 26;

Crimping pliers characterized in that the crimping matrix 23, 24 is secured in a crimping position by a positive interaction with a spring 78;

Crimping pliers characterized in that the spring 78 is a leaf spring;

Crimping pliers according to any one of claims 15 to 21, characterized in that the spring 78 is supported on the axis 17, 18 of a gear wheel;

Crimping pliers characterized in that a gauge part 75 is provided which is adapted to an outer contour of the crimping matrix 23, 24 in the region of a crimping die 27, 28 and only allows a closure of the crimping pliers 1, when the crimping matrix 23, 24 is arranged with an alignment of a crimping die 27, 28 of the crimping pliers 1 suitable for a pressing;

Crimping pliers characterized in that the gauge part 75 is configured as a plate part;

Crimping pliers characterized in that the gauge part 75 is mounted on the swivel axes of the crimping jaws 2, 3;

Crimping pliers characterized in that the crimping matrices 23, 24 are permanently coupled via the gearing independently of a swivel position of the crimping jaws 2, 3 and/or one or both of the crimping matrices 23, 24 are adjustable by means of an adjusting wheel 68, 69 optionally with an interposed gear wheel 29, 30 and that a gear wheel 29, 30 and/or the adjusting wheel 68, 69 is formed completely or partially as elastically yieldable;

Crimping pliers characterized in that the gear wheel 29, 30 and/or the adjusting wheel 68, 69 have teeth 80, wherein one or several groups 81 of two or more teeth 80 are formed, wherein further the teeth 80 of one group 81 are formed on a common retaining part 82 and the retaining part 82 is connected to a radially inner region 84 of the gear wheel 29, 30 or adjusting wheel 68, 69 via a single spring-loadable branch 83;

Crimping pliers characterized in that the branch 83 is connected to the retaining part 82 off-centre in the circumferential direction;

Crimping pliers characterized in that three, four or more teeth 80 are formed on the retaining part 82;

Crimping pliers characterized in that the crimping pliers 1 have a determination part 91 for determining a diameter of an electrical conductor on which crimping is to be carried out and that the determination part 91 has a multiplicity of passage openings 95 with respectively one narrowest cross-section which corresponds to a nominal diameter of an electrical conductor;

Crimping pliers characterized in that the determination part 91 is provided so that it can be folded out on the crimping pliers 1;

Crimping pliers characterized in that the determination part 91 can be arranged to overlap a jaw plate 11 to 14 of a crimping jaw 2, 3;

Crimping pliers characterized in that two jaw plates 11 to are arranged to overlap one another and that the determination part 91 can be arranged between the jaw plates 11 to 14;

A toothed wheel characterized in that the branch 83 is connected to the retaining part 82 off-centre in the circumferential direction;

A toothed wheel characterized in that three, four or more teeth 80 are formed on the retaining part 82.

All the disclosed features (by themselves or combined with one another) are essential to the invention. The disclosure of the application herewith also includes the disclosure content of the appurtenant/appended priority documents (copy of the prior application) in their full content, also for the purpose of incorporating features of these documents in claims of the present application. The subclaims characterize with their features independent inventive further developments of the prior art, in particular in order to make divisional applications on the basis of these claims.

REFERENCE LIST

1 Crimping pliers
2 Crimping jaw
3 Crimping jaw
4 Handle
5 Handle
6 Hinge pin
7 Bolt
8 Bolt
9 Spring ring
10 Spring ring
11 Jaw plate
12 Jaw plate
13 Jaw plate
14 Jaw plate
15 Lug
16 Lug
17 Axial bolt
18 Axial bolt
19 Lever arm
20 Lever arm 21 Lever arm
22 Lever arm
23 Crimping matrix
24 Crimping matrix
25 Axis
26 Axis
27 Crimping die
28 Crimping die
29 Gear wheel
30 Gear wheel
31 Driven wheel
32 Driven wheel
33 Part
34 Axial bolt
35 Drive wheel
36 Cylinder section
37 Cylinder section
38 Cylinder section
39 Cylinder section
40 Cylinder section
41 Driven belt
42 Driven belt
43 Drive belt
44 Transmission belt
45 Symbol
46 Window
47 Part
48 Interlocking means
49 Interlocking means
50 Continuation
51 Continuation
52 Projection
53 Projection
54 Application surface
55 Application surface
56 Application surface
57 Application surface
58 Interlocking surface
59 Interlocking surface
60 Interlocking surface
61 Interlocking surface
62 Interlocking surface
63 Interlocking surface
64 Elongated hole
65 Elongated hole
66 Spring
67 Lever
68 Adjusting wheel
69 Adjusting wheel
70 Stop pawl
71 Tension spring
72 Pawl lug
73 Lug
74 Toothed wheel segment
75 Gauge part
76 Tip
77 Sliding surface
78 Spring
79 Retaining pin
80 Tooth
81 Group
82 Retaining part
83 Branch
84 Inner region
85 Slot
86 Toothed wheel
87 Elongated hole
88 Compression spring
89 Sprocket
90 Spring arm
91 Determination part
92 Pivot pin
93 Gripping section
94 Friction projection
95 Passage opening
96 Section
A Straight line
α angle
a Arrow
b Arrow
c Arrow
d Arrow
e Arrow
r Radius
x Axis
y Axis
z Axis

The invention claimed is:

1. Crimping pliers configured to crimp cable lugs onto electrical conductors, comprising:
   a first crimping jaw;
   a second crimping jaw, the first and second crimping jaws being pivotally connected together at a pivot such that the first and second crimping jaws can be pivoted towards one another from a starting position to a crimping position around the pivot, the first and second crimping jaws pivoting in a plane around the pivot;
   a first crimping matrix mounted for rotation on the first crimping jaw around an axis of rotation, the axis of rotation of the first crimping matrix being at a right angle relative to the plane, the first crimping jaw having a circumference and a plurality of different first crimping dies formed in the circumference;
   a second crimping matrix mounted for rotation on the second crimping jaw around an axis of rotation, the axis of rotation of the second crimping matrix being at a right angle relative to the plane, the second crimping jaw having a circumference and plurality of different second crimping dies formed in the circumference of the second crimping matrix; and
   gearing connecting the first and second crimping matrices together, wherein the crimping matrices are permanently coupled to each other by the gearing independently of the pivot position of the crimping jaws.

2. The crimping pliers according to claim 1, wherein the gearing includes a first gear wheel rotatable around an axis of rotation and engaged with the first crimping matrix, the first crimping matrix is movable by the first gear wheel transversely to the axis of rotation of the first gear wheel, a second gear wheel rotatable around an axis of rotation and engaged with the second crimping matrix, the second crimping matrix is movable by the second gear wheel transversely to the axis of rotation of the second gear wheel.

3. The crimping pliers according to claim 1, further comprising
   a first bracket attached to the first crimping jaw and configured to engage against the first crimping matrix, wherein the gearing includes a first gear wheel rotatable around an axis of rotation and engaged with the first crimping matrix, and wherein the first crimping matrix is movable by the first gear wheel from a first crimping position wherein the first crimping jaw is engaged with the first bracket in a first position to a second crimping position wherein the first crimping jaw is engaged with the first bracket in a second position; and a second bracket attached to the second crimping jaw and configured to engage against the second crimping matrix, wherein the gearing includes a second gear wheel rotatable around an axis of rotation and engaged with the second crimping matrix, and wherein the second crimping matrix is movable by the second gear wheel from a first crimping position wherein the second crimping jaw is engaged with the second bracket in a first position to a second crimping position wherein the second crimping jaw is engaged with the second bracket in a second position.

4. The crimping pliers according to claim 3, further comprising a first spring mounted to the first crimping jaw and engaged with the first crimping matrix, the first spring biasing the first crimping matrix into engagement with the first bracket, wherein the first crimping matrix can be adjusted to move one of the crimping dies of the first crimping matrix into a working position by movement of the first gear wheel, the first crimping matrix moving transverse to the axis of rotation of the first crimping matrix and against a biasing force of the first spring;

a second spring mounted to the second crimping jaw and engaged with the second crimping matrix, the second spring biasing the second crimping matrix into engagement with the second bracket, wherein the second crimping matrix can be adjusted to move one of the crimping dies of the second crimping matrix into a working position by movement of the second gear wheel, the second crimping matrix moving transverse to the axis of rotation of the second crimping matrix and against a biasing force of the second spring.

5. The crimping pliers according to claim 4, wherein the bracket includes an interlocking surface, and wherein the crimping dies of the first crimping matrix are formed by tooth-like projections, wherein one of the tooth-like projections has an application surface which can be brought into engagement with the interlocking surface of the bracket in the working position of the first crimping die, wherein when viewed in a direction radial to the axis of rotation of the first crimping die, the application surface brought into engagement with the interlocking surface encloses an acute angle with respect to a straight line running through the axis of rotation of the second crimping matrix.

6. The crimping pliers according to claim 5, wherein the interlocking surface forms an ascending and/or descending sliding surface in a plan view.

7. The crimping pliers according to claim 5, wherein two opposite application surfaces are provided in relation to the straight line.

8. The crimping pliers according to claim 7, wherein the acute angles of the two application surfaces are the same.

9. The crimping pliers according to claim 4, wherein the biasing force of the spring force permits rotation of the first crimping matrix by hand.

10. The crimping pliers according to claim 5, wherein the acute angle is a value which permits rotation of the first crimping matrix by hand.

11. The crimping pliers according to claim 4, wherein the biasing force of the spring force permits rotation of the first crimping matrix only by rotation of the first gear wheel.

12. The crimping pliers according to claim 5, wherein the acute angle is a value which permits rotation of the first crimping matrix only by rotation of the first gear wheel.

13. The crimping pliers according to claim 1, further comprising a separate part attached to the second crimping matrix, wherein symbols are applied to the separate part, wherein the separate part is not exposed to crimping forces, the separate part is formed of a different material from a material from which the second crimping matrix is formed.

14. The crimping pliers according to claim 13, wherein the separate part is fixedly attached to the second crimping matrix such that the separate part rotates with the second crimping matrix.

15. The crimping pliers according to claim 13, wherein the separate part is arranged coaxially to the second crimping matrix.

16. The crimping pliers according to claim 13, wherein the separate part is attached to the second crimping jaws about an axis of rotation, and further comprising an adjustment gear mounted on the second crimping jaw and engaged with the separate part and engaged with the gearing.

17. The crimping pliers according to claim 13, wherein the symbols are printed onto the separate part.

18. The crimping pliers according to claim 13, wherein the symbols are formed integrally with the separate part.

19. The crimping pliers according to claim 1, further comprising an adjusting wheel mounted on the second crimping jaw and coupled to the gearing, the adjusting wheel being rotatable around an axis of rotation and configured to adjust the positions of the first and second crimping matrices upon rotation of the adjusting wheel via the gearing, the adjusting wheel and the second crimping matrix have different axes of rotation.

20. The crimping pliers according to claim 19, wherein the axes of rotation of the adjusting wheel and the second crimping matrix are parallel.

21. The crimping pliers according to claim 19, further comprising a first handle connected to the first crimping jaw at a first hinge, the first crimping jaw having a longitudinal axis extending in a longitudinal direction from the first hinge to a free end of the first crimping jaw; a second handle connected to the second crimping jaw at a second hinge, the second crimping jaw having a longitudinal axis extending in a longitudinal direction from the second hinge to a free end of the second crimping jaw, wherein that the axes of rotation of the adjusting wheel and the axis of rotation of the second crimping matrix are offset from each other in the longitudinal direction.

22. The crimping pliers according to claim 19, wherein the gearing includes a gear wheel attached to the second crimping jaw, and wherein the gear wheel interengages the adjusting wheel and the second crimping matrix.

23. The crimping pliers according to claim 22, wherein the adjusting wheel is formed completely or partially of an elastically yieldable material, and the gear wheel is formed completely or partially of an elastically yieldable material.

24. The crimping pliers according to claim 23, wherein the gear wheel has several groups of two or more teeth, wherein the teeth of each group are formed on a common retaining part and the common retaining part is connected to a radially inner region of the gear wheel by a single spring-loadable branch.

25. The crimping pliers according to claim 24, wherein each branch is connected to the common retaining part off-center in a circumferential direction.

26. The crimping pliers according to claim 24, wherein at least three teeth are formed on each common retaining part.

27. The crimping pliers according to claim 19, wherein the second crimping matrix is rotatable about a fixed axis.

28. The crimping pliers according to claim 19, further comprising
  a first spring mounted to the first crimping jaw and engaged with the first crimping matrix, wherein the first crimping matrix is secured in a crimping position by the first spring; and
  a second spring mounted to the second crimping jaw and engaged with the second crimping matrix, wherein the second crimping matrix is secured in a crimping position by the second spring.

29. The crimping pliers according to claim 28, further comprising
  a first gear wheel mounted on the first crimping matrix, the first gear wheel having a shaft which forms the axis of rotation of the first crimping matrix, wherein the first spring is engaged with the shaft of the first gear wheel; and
  a second gear wheel mounted on the second crimping matrix, the second gear wheel having a shaft which forms the axis of rotation of the second crimping matrix, wherein the second spring is engaged with the shaft of the second gear wheel.

30. The crimping pliers according to claim 28, wherein each spring is a leaf spring.

31. The crimping pliers according to claim 1, further comprising a gauge part mounted on the crimping jaws, the gauge part having a surface which is configured to engage an outer contour of the crimping dies.

32. The crimping pliers according to claim 31, wherein the gauge part is a plate.

33. The crimping pliers according to claim 31, wherein the gauge part is triangularly shaped.

34. The crimping pliers according to claim 1, wherein the adjusting wheel is formed completely or partially of an elastically yieldable material.

35. The crimping pliers according to claim 1, further comprising a determination part connected to the second crimping jaw, the determination part being configured to determine a diameter of an electrical conductor on which crimping is to be carried out the determination part having a plurality of passage openings, wherein the passage openings correspond with nominal diameters of respective electrical conductors.

36. The crimping pliers according to claim 35, wherein the determination part is pivotally mounted to the second crimping jaw.

37. The crimping pliers according to claim 35, wherein the determination part overlaps the second crimping jaw in a first position.

38. The crimping pliers according to claim 37, wherein the second crimping jaw comprises two jaw plates which overlap one and, wherein the determination part is positioned between the jaw plates in the first position.

39. A toothed wheel comprising:
  a radially inner region defining an axis of rotation, the radially inner region extending continuously in a circumferential direction around the axis;
  a plurality of single spring-loadable branches extending from the radially inner region;
  a retaining part extending from each single spring-loadable branch, each retaining part extending in the circumferential direction relative to the axis, a center of each retaining part is defined in the circumferential direction, and adjacent retaining parts are separated from each other in the circumferential direction; and
  two or more teeth formed on each retaining part;
  wherein each single spring-loadable branch is connected to the respective retaining part off-center in the circumferential direction of the respective retaining part.

40. The toothed wheel according to claim 39, wherein at least three teeth are formed on each retaining part.

* * * * *